(12) United States Patent
Masuda

(10) Patent No.: US 7,831,591 B2
(45) Date of Patent: Nov. 9, 2010

(54) METHOD OF SEARCHING FOR A FILE WITH A DIRECTORY IDENTIFIED FROM A FILE PATH AS A START POINT

(75) Inventor: Mineyoshi Masuda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 430 days.

(21) Appl. No.: 12/039,445

(22) Filed: Feb. 28, 2008

(65) Prior Publication Data

US 2009/0132472 A1 May 21, 2009

(30) Foreign Application Priority Data

Nov. 21, 2007 (JP) .............................. 2007-301540

(51) Int. Cl.
*G06F 7/00* (2006.01)
*G06F 17/30* (2006.01)
(52) U.S. Cl. ...................................... 707/716; 707/713
(58) Field of Classification Search ................ 707/706, 707/713, 716
See application file for complete search history.

(56) References Cited

U.S. PATENT DOCUMENTS

2005/0256956 A1* 11/2005 Littlefield et al. ........... 709/225

FOREIGN PATENT DOCUMENTS

JP 2006-092408 4/2006

* cited by examiner

*Primary Examiner*—Hosain T Alam
*Assistant Examiner*—Van H Oberly
(74) *Attorney, Agent, or Firm*—Mattingly & Malur, P.C.

(57) ABSTRACT

There is provided a file search method executed in a file search apparatus for searching for a file relevant to an application, the file search apparatus having an interface, a processor coupled to the interface, and a memory coupled to the processor. The file search method comprising the steps of: obtaining process information which includes an execution start time and file path of the application; identifying, from the obtained file path, a directory that serves as a start point in a search for a file relevant to the application; and searching, with the identified directory as the start point, for a file accessed after the execution start time of the application.

18 Claims, 24 Drawing Sheets

| PROCESS ID | PARENT PROCESS ID | START TIME | EXECUTABLE FILE PATH | COMMAND LINE ARGUMENT |
|---|---|---|---|---|
| 1056 | 1 | 2007/06/30 10:00:00 | /opt/application1/bin/product1 | -daemon |
| 2061 | 1 | 2007/05/30 09:00:00 | /opt/application2/bin/product2 | |
| 10982 | 2601 | 2007/08/03 20:00:00 | /usr/local/application3/bin/product3 | |
| 11005 | 11005 | 2006/11/23 09:00:00 | /usr/local/bin/perl | opt/product/script/program |
| ... | ... | ... | ... | ... |

*FIG. 7*

| COMPUTER INDEX | APPLICATION INDEX | APPLICATION NAME | PROCESS ID |
|---|---|---|---|
| 192.168.1.1 | 1 | APPLICATION 1 | 1234 |
| | | | 1235 |
| | | | 1236 |
| | 2 | APPLICATION 2 | 5678 |
| ⋮ | ⋮ | ⋮ | ⋮ |

301 302 304 306

| COMPUTER INDEX | APPLICATION INDEX | START POINT DIRECTORY | CERTAINTY DEGREE |
|---|---|---|---|
| 192.168.1.1 | 1 | /opt/company1/product1 | 10 |
| | | /opt/company1/share/lib | 8 |
| | | /opt/company1/share/conf | 8 |
| | 2 | /opt/company1/product2 | 10 |
| | | /opt/company1/share/conf | 8 |
| 192.168.1.2 | 1 | /opt/company1/product1 | 10 |
| | | /opt/company1/share/lib | 8 |
| | | /opt/company1/share/conf | 8 |
| | 3 | /opt/product3 | 10 |
| ⋮ | ⋮ | ⋮ | ⋮ |

| COMPUTER INDEX | APPLICATION INDEX | FILE TYPE | SETTINGS FILE PATH | CERTAINTY DEGREE | CONFIRMATION FLAG | ACCESS DATE/TIME |
|---|---|---|---|---|---|---|
| 192.168.1.1 | Product1 | config | /opt/company1/product1/system/server.ini | 20 | O | 2007/07/11 18:00:00 |
| | | config | /opt/company1/product1/system/access.lst | 20 | O | 2007/07/13 11:00:00 |
| | | config | /opt/company1/product1/user/application.conf | 20 | O | 2007/08/22 05:00:00 |
| | | config | /opt/company1/product1/user/userlist | 20 | O | 2006/12/25 04:00:00 |
| | | config | /opt/company1/share/conf/loglib.conf | 18 | X | 2007/07/11 18:00:00 |
| | | log | /opt/company1/product1/log/error.log | 20 | UNCONFIRMED | 2007/07/11 18:00:00 |
| | | log | /opt/company1/product1/log/access.log | 20 | UNCONFIRMED | 2007/08/21 07:00:00 |
| | | log | /opt/company1/share/log/trace.log | 18 | UNCONFIRMED | 2006/12/24 22:00:00 |
| ... | ... | ... | ... | ... | ... | ... |

FIG. 20

| FILE TYPE | ADD/SUBTRACT POINT | KEYWORD |
|---|---|---|
| config | ADD POINT | conf |
| | SUBTRACT POINT | bin |
| | ⋮ | |
| log | ADD POINT | log |
| | ⋮ | |

802   804   806

METHOD OF SEARCHING FOR A FILE WITH A DIRECTORY IDENTIFIED FROM A FILE PATH AS A START POINT

CLAIM OF PRIORITY

The present application claims priority from Japanese patent application P 2007-301540 filed on Nov. 21, 2007, the content of which is hereby incorporated by reference into this application.

BACKGROUND OF THE INVENTION

This invention relates to a technique of searching for a file relevant to an application in an information processing system.

An information processing system in general is composed of a plurality of applications. In an online commodity selling system, for example, a middleware application that executes computing such as an inventory check upon request from a customer, a database application that executes processing of saving customer information and inventory information, and other applications are combined to constitute one system.

Various settings about the operation of each application are usually recorded in a file called a settings file. The recording format of a settings file is typically the plain text format because of its readability and ease of editing work. Information written in a settings file includes, in addition to settings information about the operation of the application such as the buffer size and the timeout time, information about connections with other applications.

A writing mistake in a settings file which defines the operation of an information processing system directly leads to a system failure, and settings files are therefore one of the important objects managed by a maintenance person of the information processing system. For smooth maintenance work, the maintenance person has to have accurate knowledge of 1) the locations of many settings files scattered throughout the information processing system and 2) which settings file is associated with which application. Desirably, the maintenance person knows the accurate locations of a log file and a library file used as well as the locations of the settings files. A technique of managing storage location information of a file that stores information about various settings, log information, or the like has been disclosed against this background in JP 2006-92408 A.

The premise of the technique disclosed in JP 2006-92408 A is that the storage locations of various settings files, a log file, and the like are known in advance. In practice, however, knowing the location of a settings file for every application is not always easy to accomplish.

Examples of how to find a file relevant to an application in such cases include a method that uses a file search function provided by an operating system. Given a search term such as a file name, a file extension, or an update time, the file search function can find a file that matches the term from a file system.

The file search function is provided in most operating systems and is advantageous in that a flexible search for an objective file can be conducted by changing a search term. However, drawbacks in conducting a thorough search for settings files with the file search function are 1) the need to manually supply an appropriate search term and 2) the need to manually associate a found settings file with an application. Since these works have to be done manually and the same works need to be repeated each time the information system is increased in scale, a heavy burden is placed on the maintenance person. The manual works also require an appropriate selection of a search term for each application, which means that the maintenance person is required to have considerable knowledge of the information processing system. It is difficult to outsource the maintenance work of the information processing system or to hire a maintenance person who is well-versed in the workings of the information processing systems. For these reasons, maintaining an information processing system with the search function of an operating system alone is not practical measures.

SUMMARY OF THE INVENTION

This invention has been made in view of the above, and it is therefore an object of this invention to lessen the burden of an information processing system maintenance person by deducing a search term of a settings file for each application and associating the found settings file with the application.

A representative aspect of this invention is as follows. That is, there is provided a file search method executed in a file search apparatus for searching for a file relevant to an application, the file search apparatus having an interface, a processor coupled to the interface, and a memory coupled to the processor. The file search method comprising the steps of: obtaining process information which includes an execution start time and file path of the application; identifying, from the obtained file path, a directory that serves as a start point in a search for a file relevant to the application; and searching, with the identified directory as the start point, for a file accessed after the execution start time of the application.

According to an aspect of this invention, even a user who does not have much knowledge about an application can easily find out the location of a file relevant to the application.

BRIEF DESCRIPTION OF THE DRAWINGS

The present invention can be appreciated by the description which follows in conjunction with the following figures, wherein:

FIG. 7 is an explanatory diagram showing a process table which holds information about a process managed by an operating system in the search target computer in accordance with the first embodiment of this invention;

FIG. 15 is an explanatory diagram showing a search range directory table in accordance with the first embodiment of this invention;

FIG. 20 is an explanatory diagram showing a settings file table in accordance with the first embodiment of this invention;

DETAILED DESCRIPTION OF THE PREFERRED EMBODIMENTS

Embodiments of this invention will be described below with reference to the accompanying drawings.

First Embodiment

Overall Configuration

Figure 1:
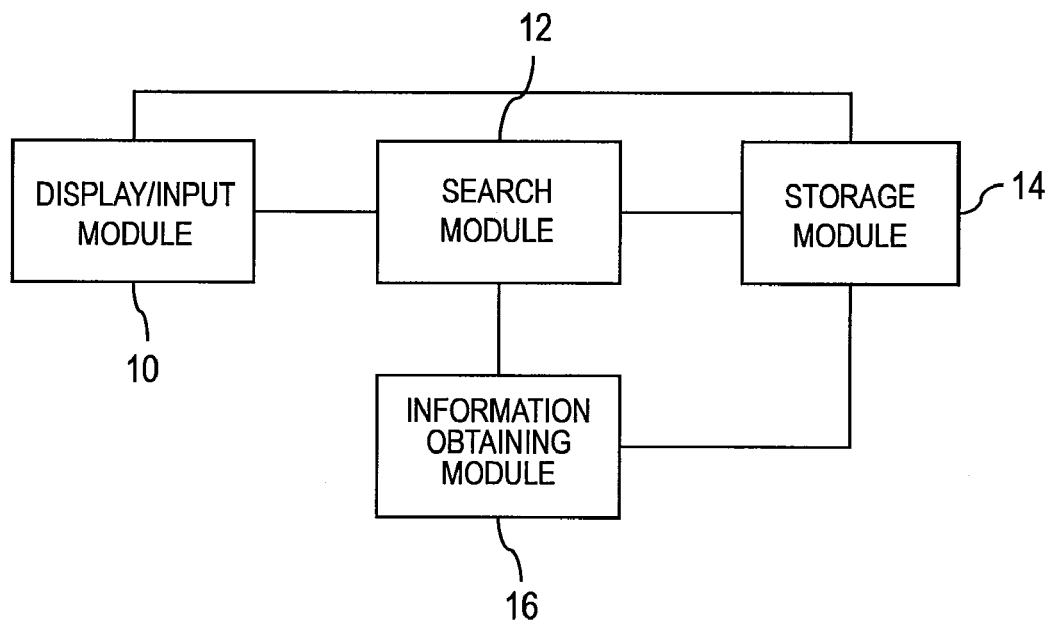
FIG. 1 is a block diagram showing an overall configuration of a search system in accordance with a first embodiment of this invention.

FIG. 1 is a block diagram showing the overall configuration of a search system according to a first embodiment of this invention.

The search system according to the first embodiment of this invention contains a display/input module 10, a search module 12, a storage module 14, and an information obtaining module 16.

The display/input module 10 receives an input specifying for which application a file search is to be conducted and which computer is to be searched. The display/input module 10 also displays results of the search conducted for the specified application and computer. The search module 12 deduces a term for the file search and executes the file search. The storage module 14 stores various tables used in search processing, or search results. The information obtaining module 16 obtains information kept in an operating system that runs on the computer to be searched, or information of a file system of the operating system.

When the display/input module 10 receives an input specifying for which application a file search is to be conducted, the search module 12 instructs the information obtaining module 16 to collect information relevant to a process that constitutes the entered application from an operating system. The collected information is stored in the storage module 14. The search module 12 then deduces a search term for retrieving a settings file relevant to the application, and instructs the information obtaining module 16 to search for a file with the use of the deduced search term. A search term deduced is, for example, a directory that serves as the start point of the search, or a term related to the attributes of a file to be searched for such as an extension.

A file found as a result of the search is given a degree of certainty which indicates a possibility of the file being relevant to the specified application, and a file path of this file is stored in the storage module 14. The display/input module 10 displays the search result to the user of the system. The user refers to the degree of certainty of the found file to determine the association between the application whose file is to be searched for and the found file.

(Hardware Configuration)

Figure 2:
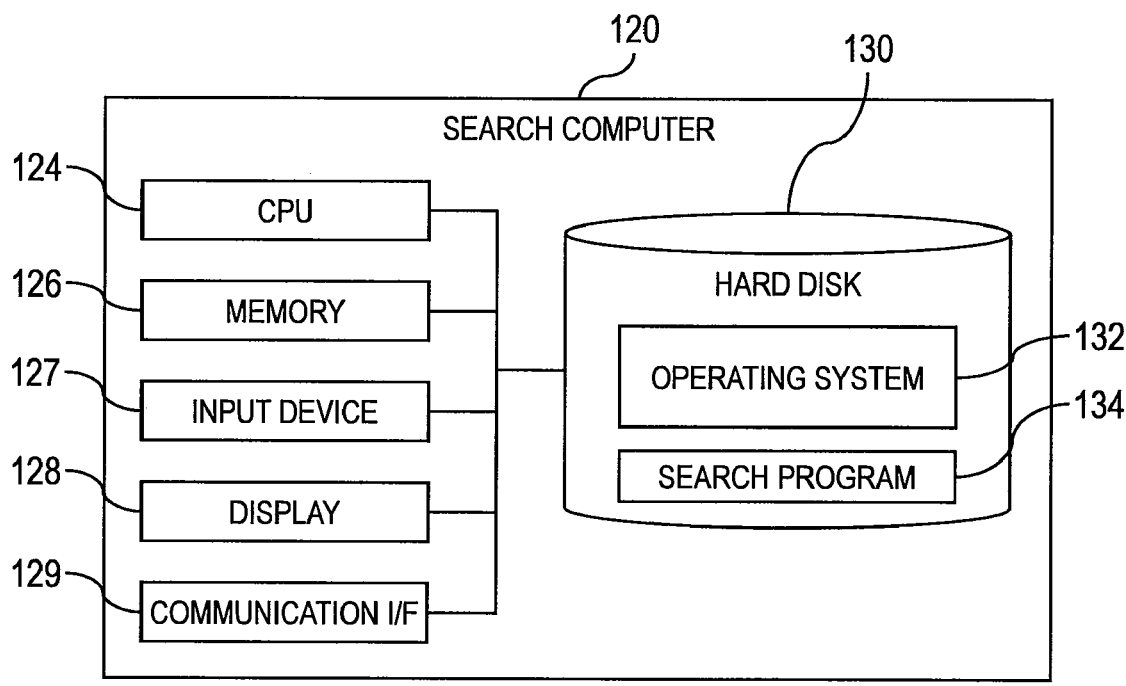
FIG. 2 is a block diagram showing a hardware configuration of a search computer in accordance with the first embodiment of this invention.

FIG. 2 is a diagram showing the hardware configuration of a search computer according to the first embodiment of this invention.

In the search system according to the first embodiment of this invention, one or more computers run applications for which a file search is to be conducted, and one computer serves as a search computer 120. The search computer 120 may run an application whose file is to be searched for.

The search computer 120 has a CPU 124, a memory 126, an input device 127, a display 128, a communication interface (I/F) 129, and a hard disk 130. The hard disk 130 stores an operating system 132 and a search program 134.

The CPU 124 runs programs stored in the memory 126 to thereby execute various types of processing. The memory 126 stores programs run by the CPU 124 and data necessary to run the programs. The input device 127 receives an input of information necessary to run the programs. The display 128 displays search results and the like. The communication I/F 129 couples to a network to communicate with another computer.

The processing of the respective modules shown in FIG. 1 is executed by the CPU 124 by running the search program 134. The storage module 14 is implemented by the memory 126 and the hard disk 130.

To give a specific description, when the search computer 120 is booted up, the operating system 132 stored in the hard disk 130 is loaded onto the memory 126. The CPU 124 executes the operating system 132. The search program 134 is run on the operating system 132.

Figure 3:
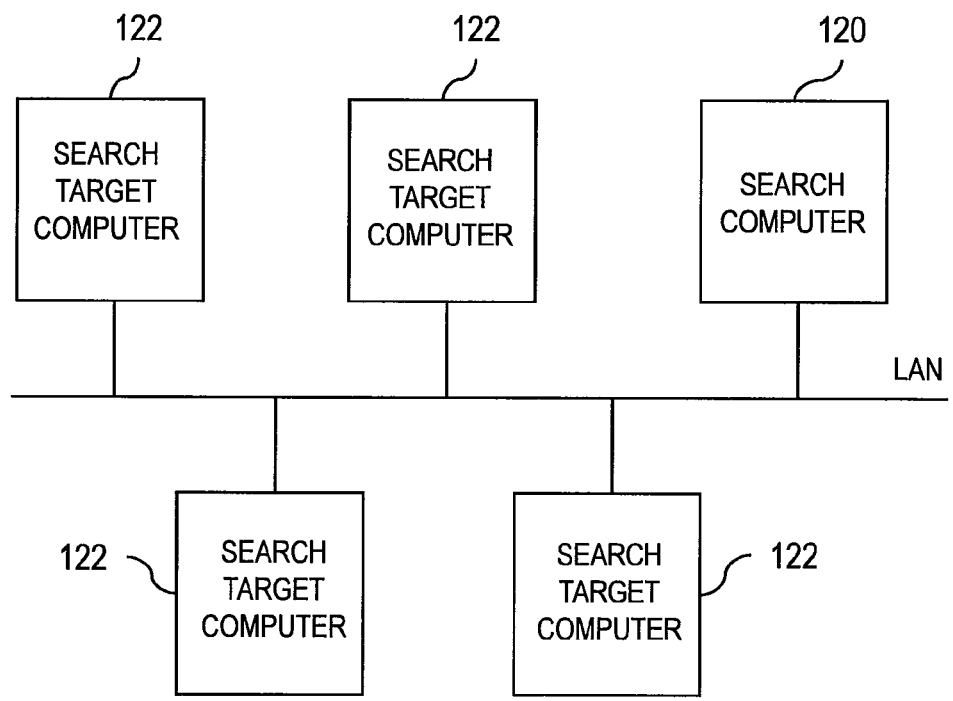
FIG. 3 is a block diagram showing a configuration of the search system that searches for a settings file of an application executed in a search target computer in accordance with the first embodiment of this invention.

FIG. 3 is a diagram showing the configuration of a search system that searches for a settings file of an application executed in a search target computer 122 according to the first embodiment of this invention.

As shown in FIG. 3, the search computer 120 and the search target computer 122 are coupled to the same network (LAN in the first embodiment of this invention). The search computer 120 searches via the network for a file kept in the search target computer 122.

Figure 4:
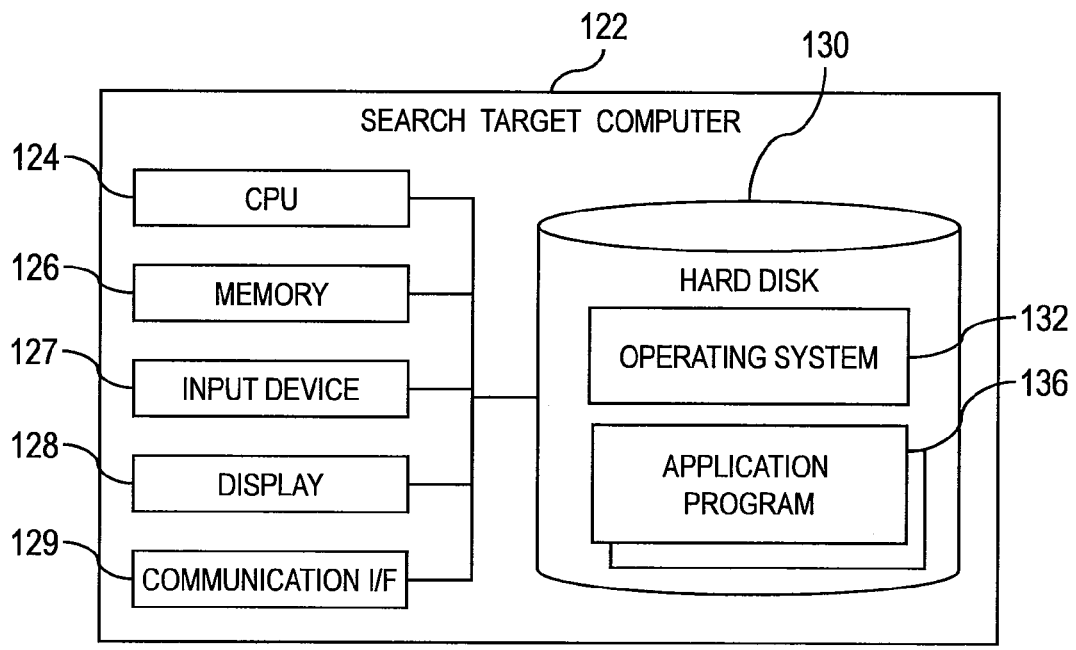
FIG. 4 is a block diagram showing a hardware configuration of a search target computer in accordance with the first embodiment of this invention.

FIG. 4 is a diagram showing the hardware configuration of the search target computer 122 according to the first embodiment of this invention.

The search target computer 122 has the CPU 124, the memory 126, the input device 127, the display 128, the communication I/F 129, and the hard disk 130. The hard disk 130 of the search target computer 122 stores the operating system 132 that controls the search target computer 122 and one or more application programs run on the search target computer 122.

The operating system 132 stores an executable file, library file, or settings file of the application program 136 in a tree structure in the hard disk 130. An example of the tree structure is shown in FIG. 5.

Figure 5:
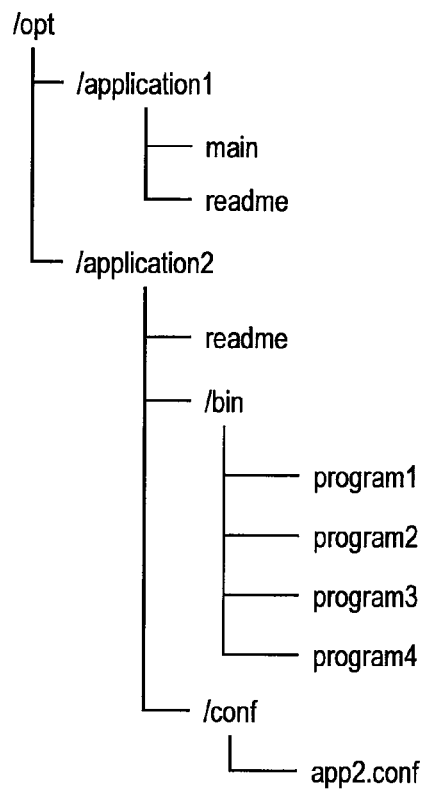
FIG. 5 is an explanatory diagram showing an example of a tree structure of a directory to be searched by the search system in accordance with the first embodiment of this invention.

FIG. 5 is a diagram showing an example of the tree structure of a directory to be searched by the search system according to the first embodiment of this invention.

In the tree structure of FIG. 5, an application1 directory and an application2 directory are created in an opt directory. The application1 directory and the application2 directory store executable files, settings files, and the like of their respective applications. An executable file of the application program 136 that is allocated to the application2 directory is stored in, for example, a directory "/opt/application2/bin/program1".

The application program 136 is executed as a process 138 run on the operating system 132.

Figure 6:
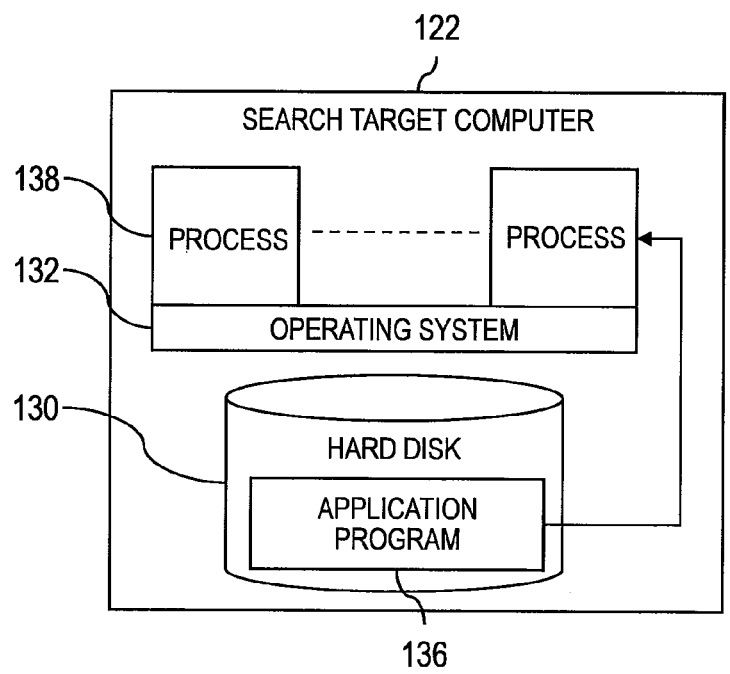
FIG. 6 is an explanatory diagram showing an example of turning an application into a process in accordance with the first embodiment of this invention.

FIG. 6 is a diagram showing an example of turning an application into a process according to the first embodiment of this invention.

As shown in FIG. 6, the application program 136 is executed by the CPU 124 as the process 138 run on the operating system 132. The example of FIG. 6 is a case in which the application program 136 operates as a single process 138, but the application program 136 may operate as a group consisting of a plurality of processes 138.

The following description on the operation of the respective modules of the search system according to the first embodiment of this invention will be given with reference to flow charts. First, before describing the processing of the respective modules shown in FIG. 1, pre-processing of the processing will be described.

(Pre-Processing)

In the pre-processing, the search computer 120 obtains the process 138 constituting an application that is run on the operating system of the search target computer 122. The operating system of the search target computer 122 keeps information for managing the process that is being executed. The operating system uses a conventional technique to obtain information of the process that is being executed, and the technique is installed as a function of the operating system.

The search computer 120 collects information about a process that is being executed in the search target computer 122 in the pre-processing. A process table 200 kept in the operating system of the search target computer 122 will be described first with reference to FIG. 7.

FIG. 7 shows the process table 200, which holds information about the process 138 managed by the operating system 132 in the search target computer 122 according to the first embodiment of this invention.

The process table 200 is stored in the search target computer 122. The process table 200 contains in each entry a process ID 202, a parent process ID 204, a start time 206, an executable file path 208, and a command line argument 210.

The process ID 202 is an identifier for identifying a process executed in the search target computer 122. The parent process ID 204 is the identifier of a parent process that calls up the process identified by the process ID 202. When the process does not have a parent process, the process ID of the operating system is stored as the parent process ID 204.

The start time 206 is a time at which the process is started. The executable file path 208 indicates a directory where the application program 136 that corresponds to this process is stored. The command line argument 210 is an argument given at the time the process is started.

The search computer 120 obtains the process table 200 as the one shown in FIG. 7 from the search target computer 122, and stores as an application configuration table 300.

Figures 8, 9:
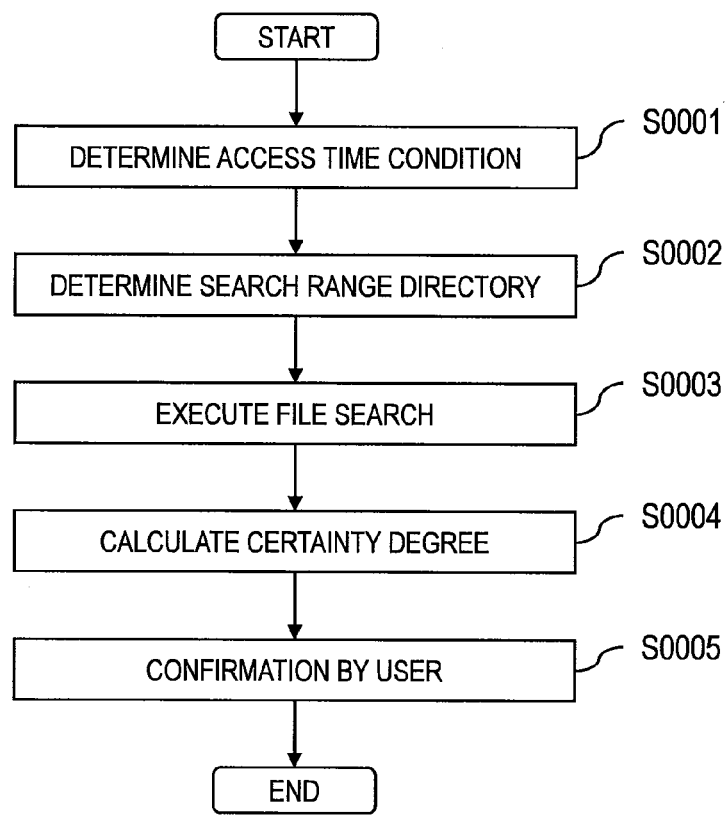
FIG. 8 is showing a application configuration table which is collected information of a process run on the search target computer in accordance with the first embodiment of this invention.
FIG. 9 is a flow chart showing a procedure of a settings file search processing in accordance with the first embodiment of this invention.

FIG. 8 is a diagram showing the application configuration table 300, which is collected information of the process 138 run on the search target computer 122 according to the first embodiment of this invention.

The application configuration table 300 is stored in the storage module 14 of the search computer 120. The application configuration table 300 contains in each entry a computer index 301, an application index 302, an application name 304, and a process ID 306.

The computer index 301 indicates the identifier of the search target computer 122. The application index 302 indicates an identifier for identifying an application. The application name 304 is the name of the application identified by the application index 302. The process ID 306 is the identifier of a process that executes this application.

The search computer 120 first groups the processes 138 that constitute an application together based on the process information of each search target computer 122 which is read from the process table 200 shown in FIG. 7, and creates a new entry to the application configuration table 300.

Examples of how to group processes include putting the processes 138 that have a parent-child relation into one group based on the process ID 202 and the parent process ID 204 in the process table 200. Another example is to group together processes whose executable files are in the same directory by referring to the executable file path 208.

The search computer 120 creates one entry in the application configuration table 300 for one group of the processes 138, and records the application index 302, the application name 304, and the process ID 306 of every process in the group in the same entry.

(Outline of Search Processing)

Now, settings file search processing according to the first embodiment of this invention will be outlined.

FIG. 9 is a flow chart showing the procedure of the settings file search processing according to the first embodiment of this invention.

This processing is executed by the CPU 124 of the search computer 120 by processing the search program 134.

The CPU 124 of the search computer 120 determines an access time condition (S0001). The access time condition is a condition about the time period in which a settings file to be searched for has been accessed. For example, a period between the time at which an application that uses the settings file to be searched for is activated and the time at which this settings file is accessed is specified as the access time condition.

The CPU 124 of the search computer 120 next narrows down the search range by determining which directory should be the start point of the search (S0002). The order in which S0001 and S0002 are executed is not fixed.

Using the search terms determined in S0001 and S0002, the CPU 124 of the search computer 120 executes actual search processing to search a file system and obtain a list of files that match the search terms (S0003). The CPU 124 of the search computer 120 also evaluates the attributes of the retrieved files and calculates their degrees of certainty (S0004). Lastly, the CPU 124 of the search computer 120 displays the list of the retrieved files to the user of the system along with the degrees of certainty calculated in S0004, and receives an input of approval or disapproval of the search results from the user of the system to improve the search result reliability (S0005).

Details of the processing of the respective steps (S0001 to S0005) will be described below with reference to flow charts.

(S0001: Determining an Access Time Condition)

Figure 10:
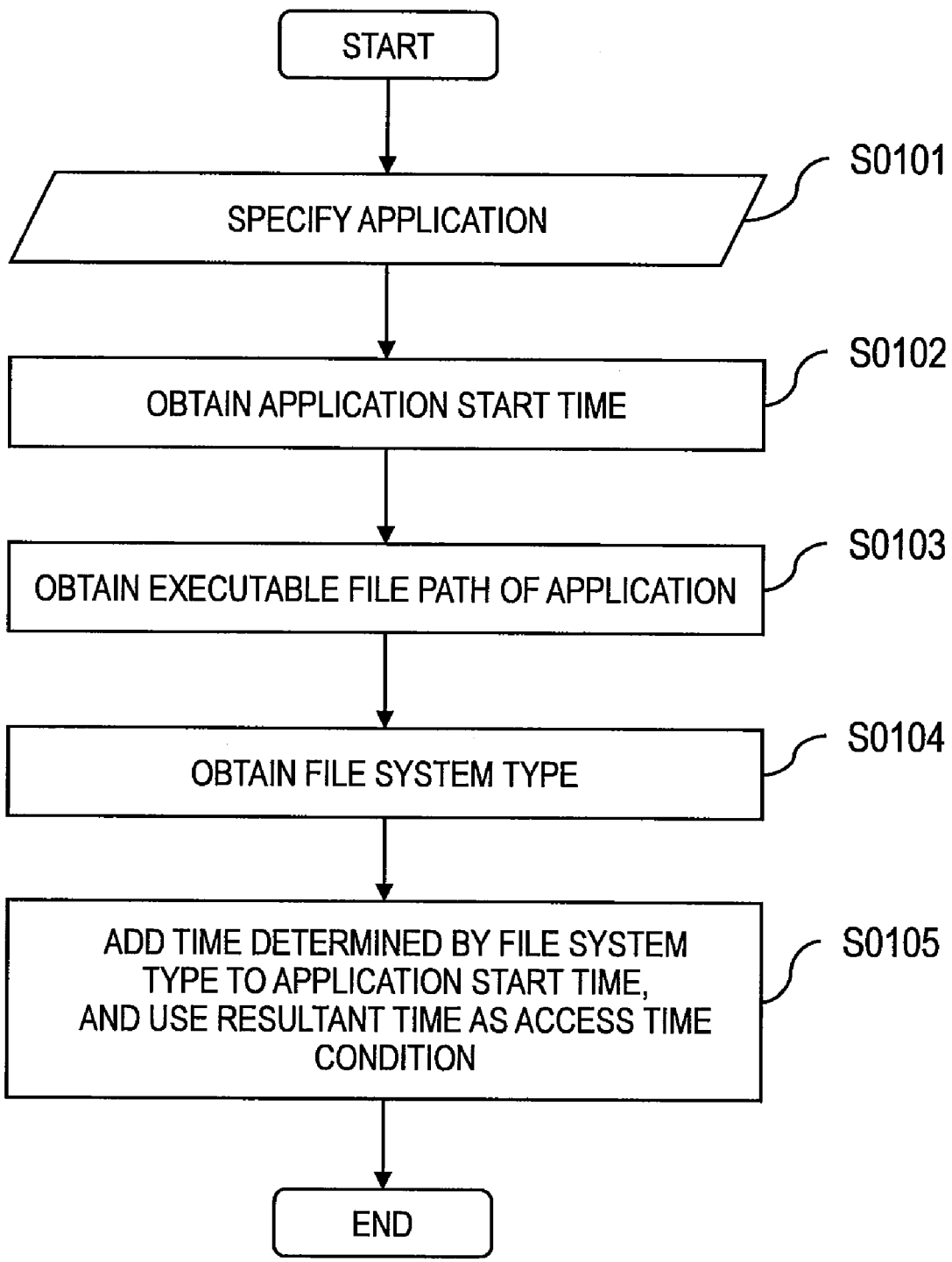
FIG. 10 is a flow chart showing a procedure of determining an access time condition in accordance with the first embodiment of this invention.

FIG. 10 is a flow chart showing the procedure of the processing of determining an access time condition according to the first embodiment of this invention.

The CPU 124 of the search computer 120 first reads the application configuration table 300 out of the storage module 14. The display/input module 10 presents a list of applications of each search target computer 122 to the user of the system.

The CPU 124 of the search computer 120 receives an input from the user of the system through the display/input module 10 that specifies for which application on the displayed application list a file search is to be conducted (S0101). Specifically, the specified application and the search target computer 122 that runs this application are received as the input.

The CPU 124 of the search computer 120 uses the search module 12 to obtain every process 138 that constitutes the specified application of the specified search target computer 122 from the application configuration table 300 stored in the storage module 14. The CPU 124 of the search computer 120 then executes the information obtaining module 16 to obtain the start time 206 of every process 138 that constitutes the specified application from the process table 200 that is managed by the operating system 132 run on the specified search target computer 122. The earliest time out of the obtained process start times 206 is determined as the start time of this application (S0102).

The CPU 124 of the search computer 120 uses the information obtaining module 16 through the search module 12 to obtain the executable file path 208 and command line argument 210 of the process 138 from the process table 200 managed by the operating system 132 run on the specified search target computer 122. In the case where the executable file path of the process 138 is an interpreter of Java (registered trademark), Perl, or the like, a file path specified in the command line argument is treated as the executable file path of this process (S0103).

The CPU 124 of the search computer 120 uses the information obtaining module 16 through the search module 12 to make an inquiry to the operating system 132 of the search target computer 122 and obtain the type of a file system in which an executable file of the process 138 is recorded (S0104).

The CPU 124 of the search computer 120 adds a time that is determined by the file system type obtained in S0104 (for example, minus an hour, or zero hour if there is no need to add a time) to the application start time obtained in S0102, and uses the resultant time as an access time condition (S0105). An access time condition used in a search needs to be adjusted by a cache valid period because, in some types of file system, the record of access times is cached for a given period of time and an access time is not reflected immediately while the cache is valid.

Modification Example of how an Access Time Condition is Determined

A partially modified procedure of the processing of FIG. 10 of determining an access time condition will be described.

Figure 11:
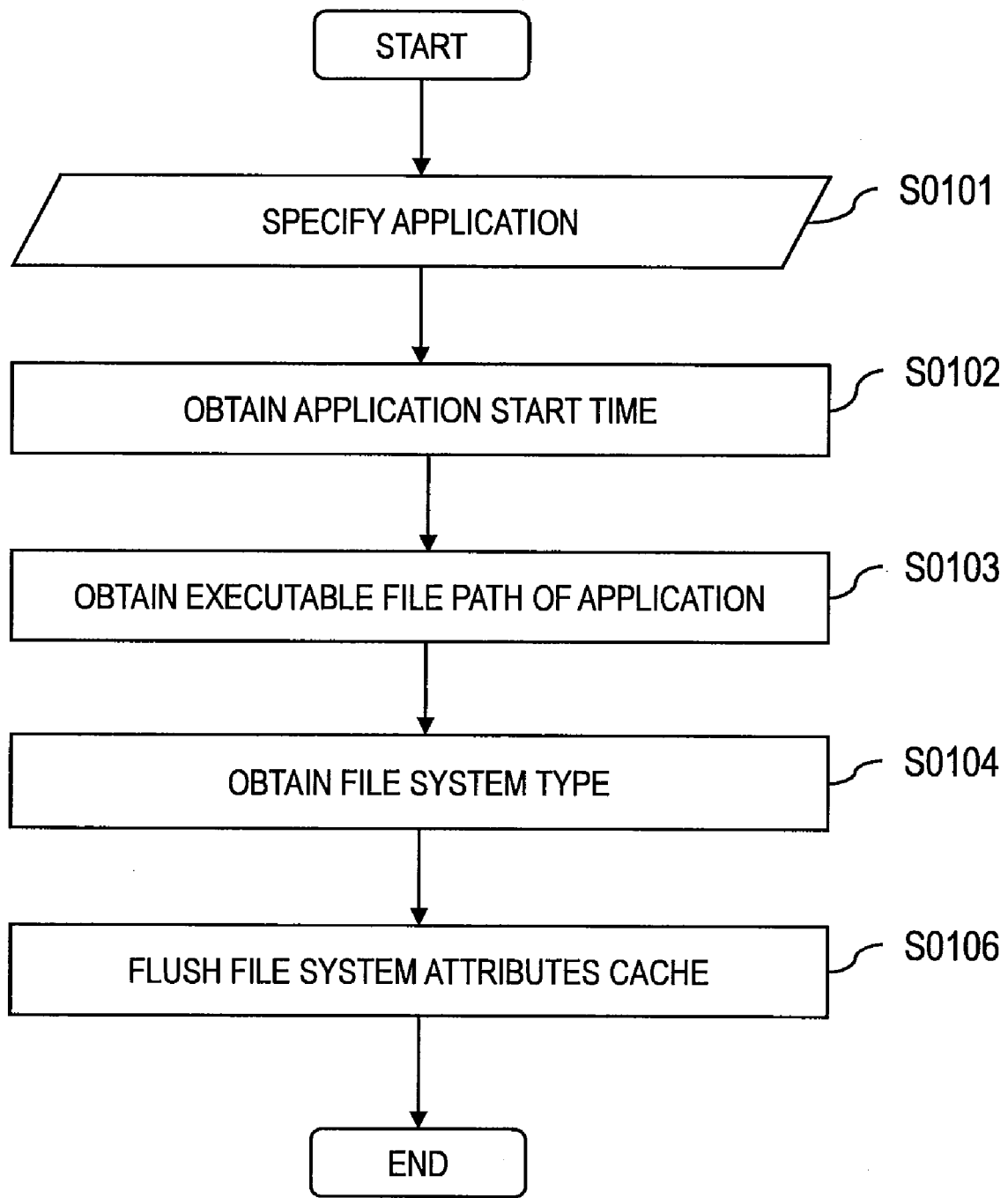
FIG. 11 is a flow chart showing a modification example of a processing of determining an access time condition in accordance with the first embodiment of this invention.

FIG. 11 is a flow chart showing a modification example of the processing of determining an access time condition according to the first embodiment of this invention.

A difference from the procedure shown in FIG. 10 is that S0105 is replaced by S0106. The rest of the procedure shown in FIG. 11 is the same as the one shown in FIG. 10.

Depending on the file system type obtained in S0104, if necessary, the CPU 124 of the search computer 120 uses the information obtaining module 16 to instruct the operating system 132 of the search target computer 122 to flush an attribute value cache of the file system and write the data back to the hard disk (S0106). The need to adjust the access time condition in the case where an access time is not reflected immediately while the cache is valid is eliminated by making cached data reflected on the file system.

(S0002: Determining a Search Range Directory)

Described next is a procedure of determining the range of search for a settings file.

Figure 12:
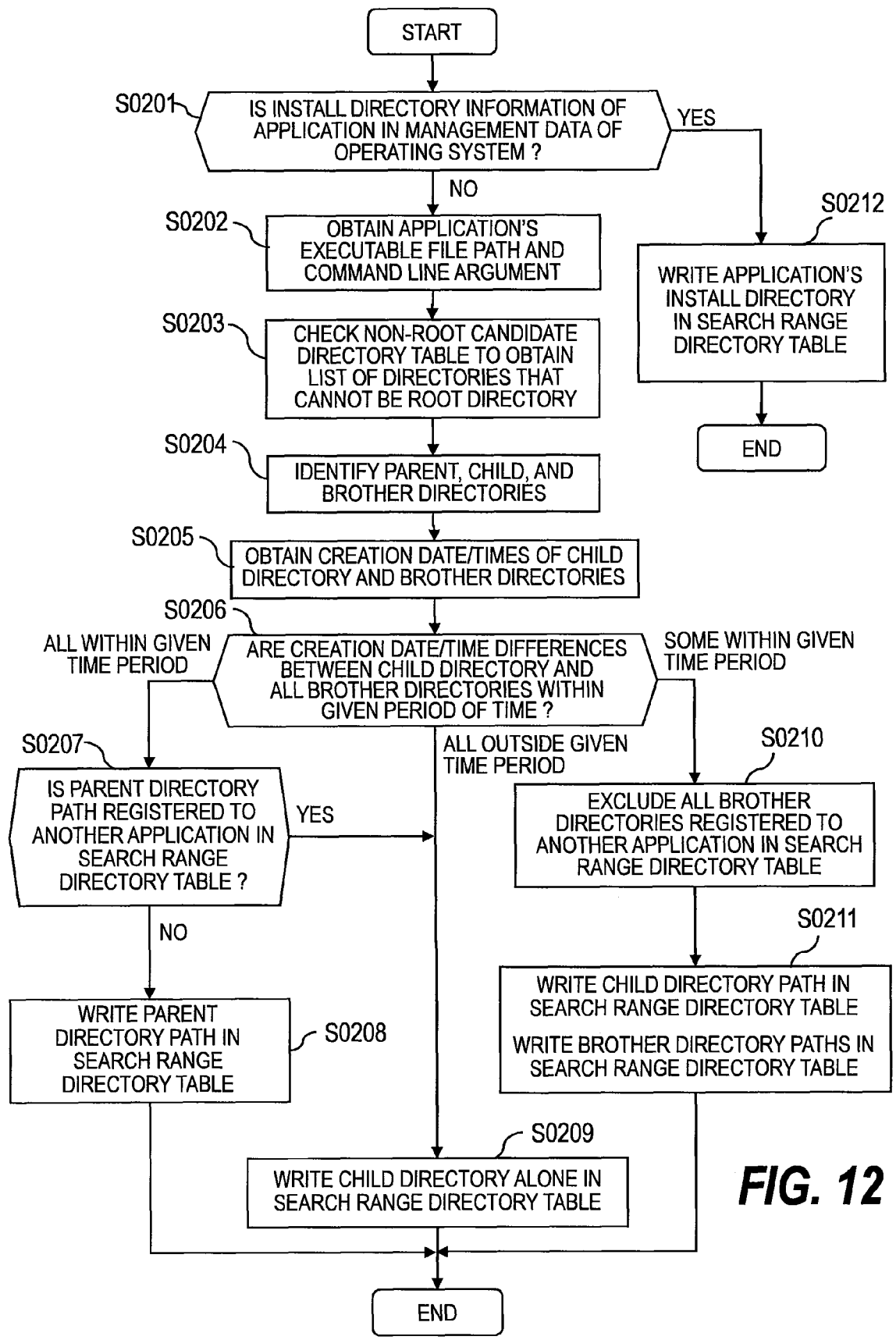
FIG. 12 is a flow chart showing a procedure of determining a directory to be searched for a settings file in accordance with the first embodiment of this invention.

FIG. 12 is a flow chart showing a procedure of determining a directory to be searched for a settings file according to the first embodiment of this invention.

The CPU 124 of the search computer 120 uses the information obtaining module 16 to make an inquiry to the operating system 132 of the search target computer 122 and judge whether or not the install directory of the application for which the file search is conducted is in management data of the operating system 132 (S0201). The management data of the operating system 132 is records of RPM when it is a Linux (registered trademark) OS, and information stored in the registry when it is a Windows OS. The presence or absence of the install directory is judged in S0201 because a settings file of an application is likely to be stored in the application's install directory.

When the install directory is not found in the management data (the answer to S0201 is "No"), the CPU 124 of the search computer 120 obtains the application's executable file paths and command line arguments as in S0103 of FIG. 10 (S0202).

The CPU 124 of the search computer 120 uses the search module 12 to obtain excluded directories, which are considered to be unlikely to serve as the root directory of the search range (S0203). Specifically, the CPU 124 of the search computer 120 refers to a non-root candidate directory table 400, which will be described later with reference to FIG. 13, to identify an operating system index 401 from the type of the operating system 132 of the search target computer 122, and obtain a list of non-root candidate directories 402 that are associated with the identified operating system index 401.

Figure 13:
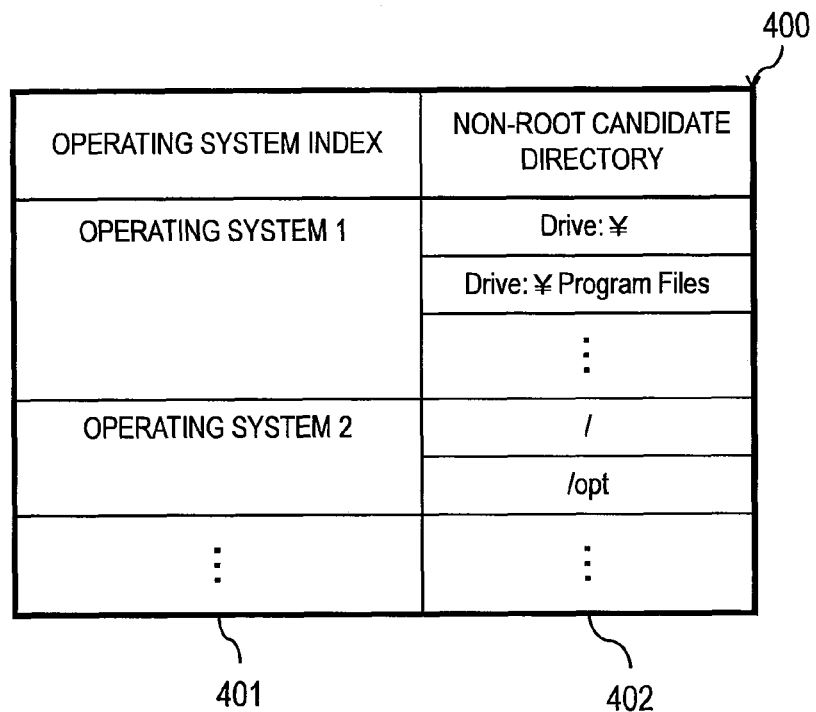
FIG. 13 is an explanatory diagram showing a non-root candidate directory table in accordance with the first embodiment of this invention.

FIG. 13 is a diagram showing the non-root candidate directory table 400 according to the first embodiment of this invention.

The non-root candidate directory table 400 is stored in the memory 126 of the search computer 120. Data stored in the non-root candidate directory table 400 is entered in advance by an administrator or the like.

The non-root candidate directory table 400 contains in each entry the operating system index 401 and the non-root candidate directory 402. The operating system index 401 indicates an identifier assigned to each operating system. The non-root candidate directory 402 indicates a directory to be excluded from the search which is determined for each operating system.

The description returns to the procedure of FIG. 12 of determining which directory is to be searched for a settings file.

The CPU 124 of the search computer 120 identifies "parent", "child", and "brother" directories based on the application's executable file paths obtained in S0202 and the list of the non-root candidate directories 402 obtained in S0203.

A parent directory is a directory that has a directory below itself. In the first embodiment of this invention, a parent directory is a directory that is on the full path of an application's executable file and that is not a non-root candidate directory.

A child directory is a directory that is on the full path of an application's executable file and that is created immediately below a parent directory. A brother directory is a directory that is created immediately below a parent directory but is not on the full path of an application's executable file.

A supplementary description will be given on the definitions of a parent directory, a child directory, and a brother directory with reference to FIG. 14.

Figure 14:
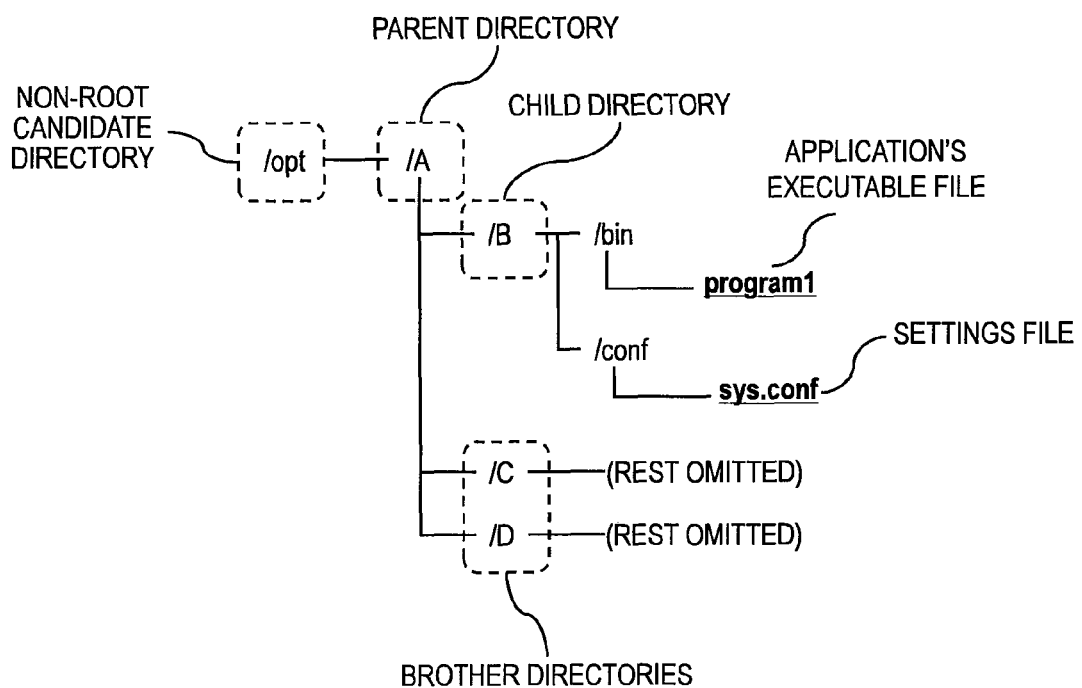
FIG. 14 is an explanatory diagram showing a directory structure for specifying a search range in accordance with the first embodiment of this invention.

FIG. 14 is a diagram illustrating a directory structure for specifying a search range according to the first embodiment of this invention.

In the directory structure example shown in FIG. 14, when the application's executable file is "program1", its full path is "/opt/A/B/bin/program1". "/opt" is included in the non-root candidate directories obtained in S0203.

Then the parent directory is on "/opt/A/B/bin" and is expressed as "/opt/A" as a child directory of "/opt". The parent directory has a child directory "/opt/A/B", which has brother directories "/opt/A/C" and "/opt/A/D".

The description returns to the procedure of FIG. 12 of determining which directory is to be searched for a settings file.

The CPU 124 of the search computer 120 uses the information obtaining module 16 through the search module 12 to obtain the creation date/times of the child directory and the brother directories from the operating system 132 of the search target computer 122 (S0205).

The CPU 124 of the search computer 120 compares the creation date/times of the child directory and the brother directories which have been obtained in S0205 (S0206).

In the case where the creation date/times of the child directory and the brother directories are within a given period of time (the answer to S0206 is "all within set time period"), the CPU 124 of the search computer 120 judges whether or not the parent directory is found in a search range directory table 500 (S0207). Specifically, the search module 12 looks up the search range directory table 500 stored in the storage module 14 and judges whether or not the search range directory table 500 has an entry whose computer index 502 and start point directory 506 match the index of the search target computer 122 and the path of the parent directory, respectively. When the creation date/times of the child directory and the brother directories are within a given period of time, since all brother directories including the child directory have been created around the same time, it is judged that the possibility of the parent directory being the install directory is strong.

Judging whether or not the parent directory has been registered in the search range directory table 500 prevents double registration of an application which prolongs the search time. The search range directory table 500 will be described with reference to FIG. 15.

FIG. 15 is a diagram showing the search range directory table 500 according to the first embodiment of this invention.

The search range directory table 500 records candidates for the search start point directory for each application executed in the search target computer 122 which is searched for a settings file. The search range directory table 500 is stored in the storage module 14.

The search range directory table 500 contains in each entry the computer index 502, an application index 504, the start point directory 506, and a certainty degree 508.

The computer index 502 indicates an identifier assigned to each search target computer 122. The application index 504 indicates the identifier of an application executed in the search target computer 122 that is identified by the computer index 502. The start point directory 506 is a directory that serves as the start point of a search for a settings file. The certainty degree 508 is a value indicating how likely it is that the directory registered as the start point directory 506 is relevant to the application identified by the application index 504.

The description returns to the procedure of FIG. 12 of determining which directory is to be searched for a settings file.

When the parent directory is found in the search range directory table 500 (the answer to S0207 is "Yes"), it means that the parent directory has been registered as the install directory of another application. Then the CPU 124 of the search computer 120 sets the child directory as the install directory of the application in question by creating a new entry in the search range directory table 500 that has the child directory as the start point directory 506 (S0209). A high score is set to the certainty degree 508 of the new entry since the child directory is likely to be the install directory.

When the parent directory is found in the search range directory table 500 (the answer to S0207 is "No"), the CPU 124 of the search computer 120 creates a new entry in the search range directory table 500 that has the parent directory as the start point directory 506 (S0208). A high score is set to the certainty degree 508 of the new entry since the parent directory is likely to be the install directory.

In the case where the differences between the creation date/time of the child directory and the creation date/times of its brother directories are all outside of a given period of time (the answer to S0206 is "all outside set time period"), the CPU 124 of the search computer 120 executes S0209 described above. The child directory is used as the start point directory because the brother directories have been created distinctively earlier or later than the child directory and are therefore likely to be the install directories of other applications.

In the case where the differences between the creation date/time of the child directory and the creation date/times of some of its brother directories are within a given period of time (the answer to S0206 is "some within set time period"), the CPU 124 of the search computer 120 registers the brother directories that have been created within the given period of time from the creation date/time of the child directory in the search range directory table 500.

The CPU 124 of the search computer 120 first looks up the search range directory table 500 stored in the storage module 14 for an entry whose computer index 502 and start point directory 506 match the index of the search target computer 122 and the path of any of the brother directories. In the case where the search range directory table 500 already has such entries, the brother directories written in those entries are excluded from the file search (S0210).

The CPU 124 of the search computer 120 then creates new entries in the search range directory table 500 to write the child directory and its brother directories that have not been excluded in S0210 as the start point directory 506 (S0211). In the new entry for the child directory, a high score is set to the certainty degree 508 since the child directory is likely to be the install directory of the application in question. In the new entries for the brother directories, a score lower than those of the parent directory and the child directory is set to the certainty degree 508 since the brother directories are less likely to be the install directory of the application in question than the parent directory or the child directory is.

When the install directory is found in the management data (the answer to S0201 is "Yes"), the CPU 124 of the search computer 120 creates a new entry in the search range directory table 500 that holds as the start point directory 506 the application's install directory obtained from the management data of the operating system 132 (S0212). A score higher than the ones given to the parent directory and the child directory in S0208, S0209, and S0211 is set to the certainty degree 508 of the install directory obtained from the management data of the operating system 132.

First Modification Example of S0002

Determining a Search Range Directory

A partially modified procedure of the processing of FIG. 12 of determining a search range directory will be described.

Figure 16:
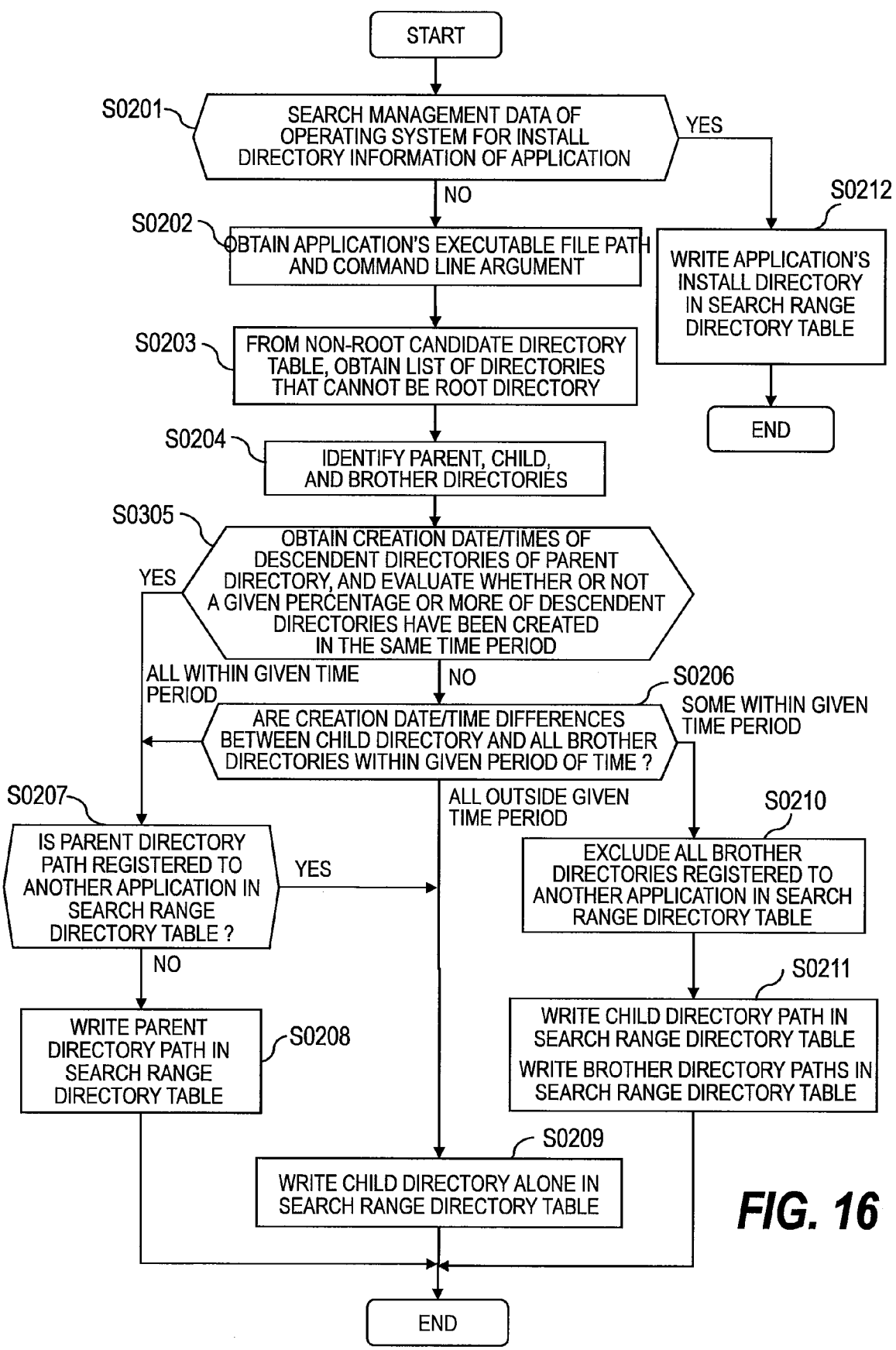
FIG. 16 is a flow chart showing a procedure of determining which directory is to be searched for a settings file in accordance with a first modification example of the first embodiment of this invention.

FIG. 16 is a flow chart showing a first modification example of the procedure of determining which directory is to be searched for a settings file according to the first embodiment of this invention.

The difference between the flow chart shown in FIG. 12 and the flow chart shown in FIG. 16 is that S0205 of FIG. 12 is replaced by S0305 in FIG. 16.

The CPU 124 of the search computer 120 calculates creation date/time differences for all descendent directories of the parent directory to judge whether or not the number of descendent directories whose creation date/time differences are within a given period of time reaches a given percentage of the total number of the descendent directories or higher (S0305).

In the case where the number of descendent directories of the parent directory whose creation date/time differences are within a given period of time reaches a given percentage of the total number of the descendent directories or higher (the answer to S0305 is "Yes"), the CPU 124 of the search computer 120 judges that the parent directory is likely to be the install directory, and executes S0207.

In the case where the number of descendent directories of the parent directory whose creation date/time differences are within a given period of time does not reach a given percentage of the total number of the descendent directories (the answer to S0305 is "No"), the CPU 124 of the search computer 120 executes S0206 described above.

Second Modification Example of S0002

Determining a Search Range Directory

Another partially modified procedure of the processing of FIG. 12 of determining a search range directory will be described.

Figure 17:
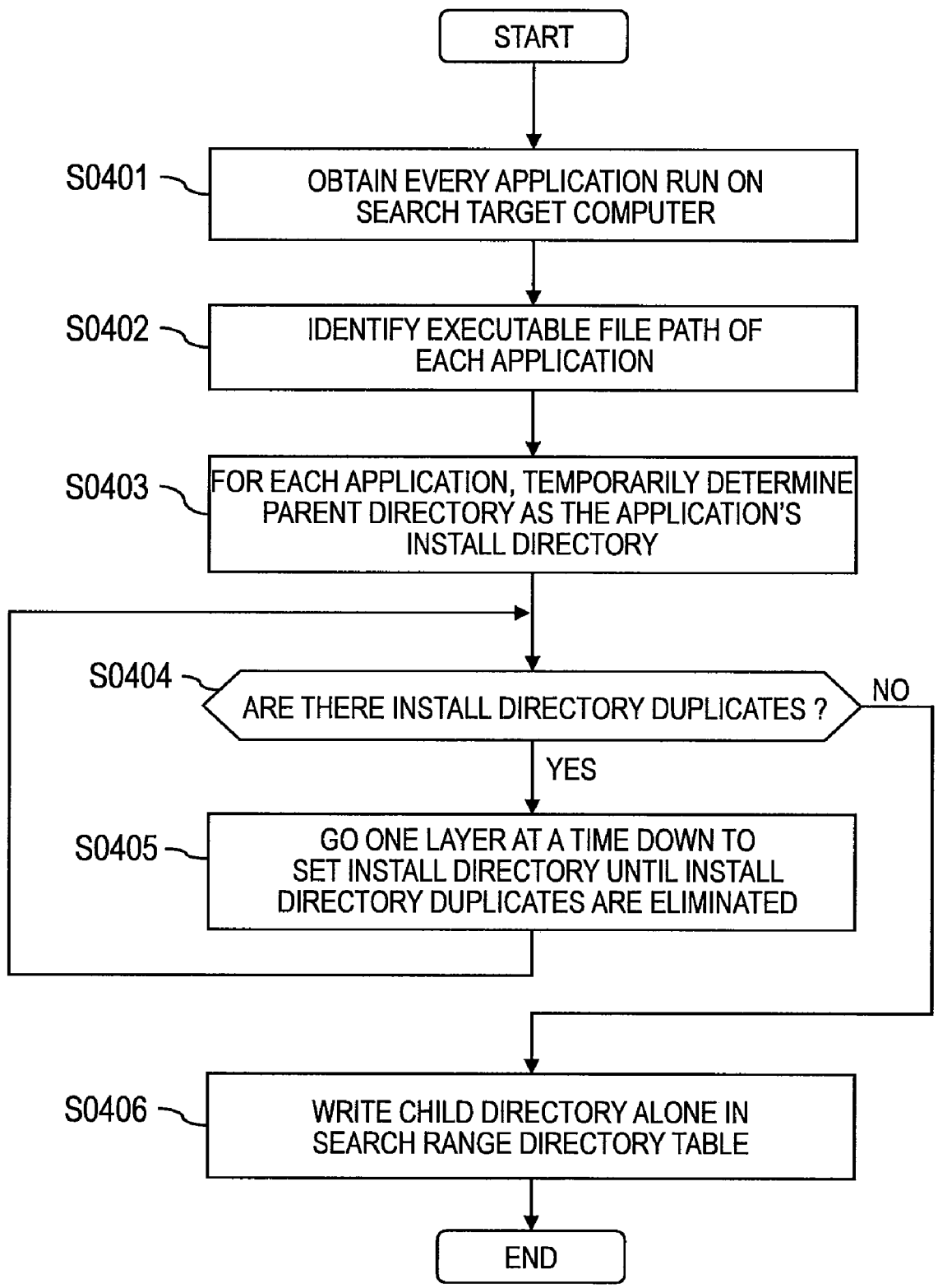
FIG. 17 is a flow chart showing a procedure of determining which directory is to be searched for a settings file in accordance with a second modification example of the first embodiment of this invention.

FIG. 17 is a flow chart showing a second modification example of the procedure of determining which directory is to be searched for a settings file according to the first embodiment of this invention.

The CPU 124 of the search computer 120 uses the search module 12 to obtain all entries about the search target computer 122 from the application configuration table 300, and identify every application that is run on the search target computer 122 (S0401).

The CPU 124 of the search computer 120 refers to the process table 200 kept in the operating system 132 of the search target computer 122 and identifies the executable file path of each application identified in S0401 (S0402). S0402 is the same as S0202 of FIG. 12, and the description will be omitted here.

The CPU 124 of the search computer 120 deduces the parent directory from the application's executable file path obtained in S0402 (S0403). The parent directory is deduced by the same method that is used in S0204 of FIG. 12, and the description of the method will be omitted here. The deduced parent directory is treated as a temporary install directory.

The CPU 124 of the search computer 120 judges whether or not there are duplicates among the install directories of the respective applications which have been obtained in S0403 (S0404).

When there are duplicates among the install directories (the answer to S0404 is "Yes"), the CPU 124 of the search computer 120 eliminates the install directory duplicates by allocating different install directories to the applications that have the same install directory (S0405).

To give a specific description on a procedure of eliminating install directory duplicates, the CPU 124 of the search computer 120 first uses the current install directory as the start point and sets a directory one layer down the start point along the executable file path as a new install directory. For example, when the executable file path is "/opt/A/B/C/bin/ main.exe" and the current install directory is "/opt/A", the directly one layer down the current install directory, "/opt/A/B" is set as a new install directory.

The CPU 124 of the search computer 120 repeats S0404 to judge whether or not there is a duplicate of the newly set install directory (S0404). When the newly set install directory also has a duplicate, S0405 is executed again to adjust directory allocation.

When there are no duplicates among the install directories (the answer to S0404 is "No"), the CPU 124 of the search computer 120 adds new entries having the install directories of the respective applications as the start point directory 506 to the search range directory table 500 (S0406). In the case where an application already has an entry in the search range directory table 500, no additional entry is created for this application.

In the first embodiment of this invention, as described above, the install directory of an application executed in the search target computer 122 is obtained and used as the start point directory in a search for the application's settings file. However, a search range set through the above procedure is not always sufficient and sometimes the search range directory has to be corrected. An example of a window that displays search range directories for correction will be described.

Figure 18:
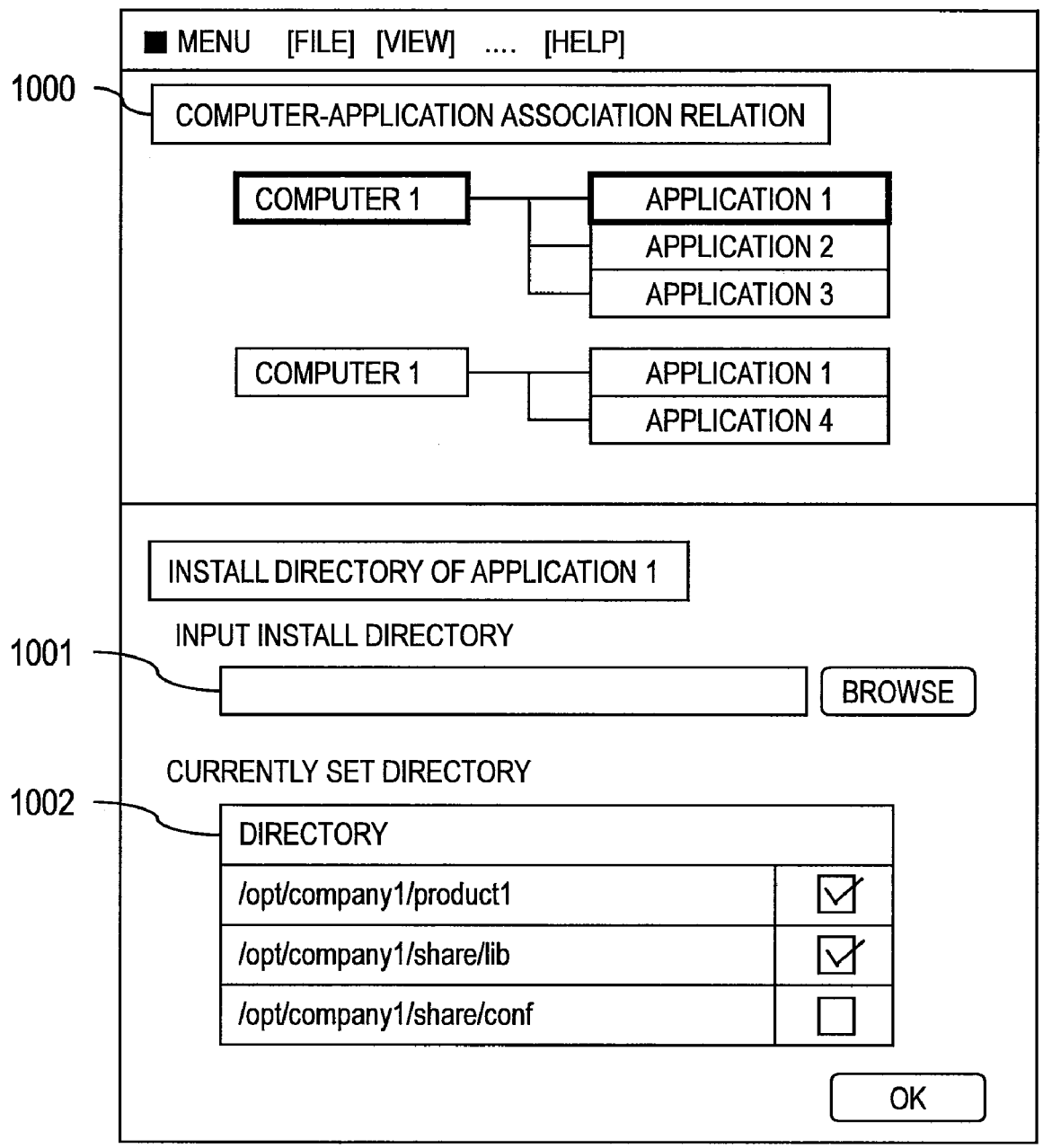
FIG. 18 is an explanatory diagram showing an example of a search range directory display window in accordance with the first embodiment of this invention.

FIG. 18 is a diagram showing an example of a search range directory display window according to the first embodiment of this invention.

The search range directory display window is displayed by the display/input module 10 of the search computer 120. The search range directory display window contains a computer-application association relation display section 1000 and an install directory input/correction section. The install directory input/correction section contains an install directory input field 1001 and a currently set directory list 1002.

The computer-application association relation display section 1000 displays a list of applications executed in a computer. A user selects on the window an application whose search range directories are to be displayed, and a list of search range directories of the specified application is displayed in the currently set directory list 1002. The currently set directory list 1002 displays directories obtained by the search range directory determining processing described above, but it is also possible for the user to manually enter a directory in the install directory input field 1001.

(S0003: File Search Processing)

A procedure of searching for a settings file will be described next.

Figure 19:
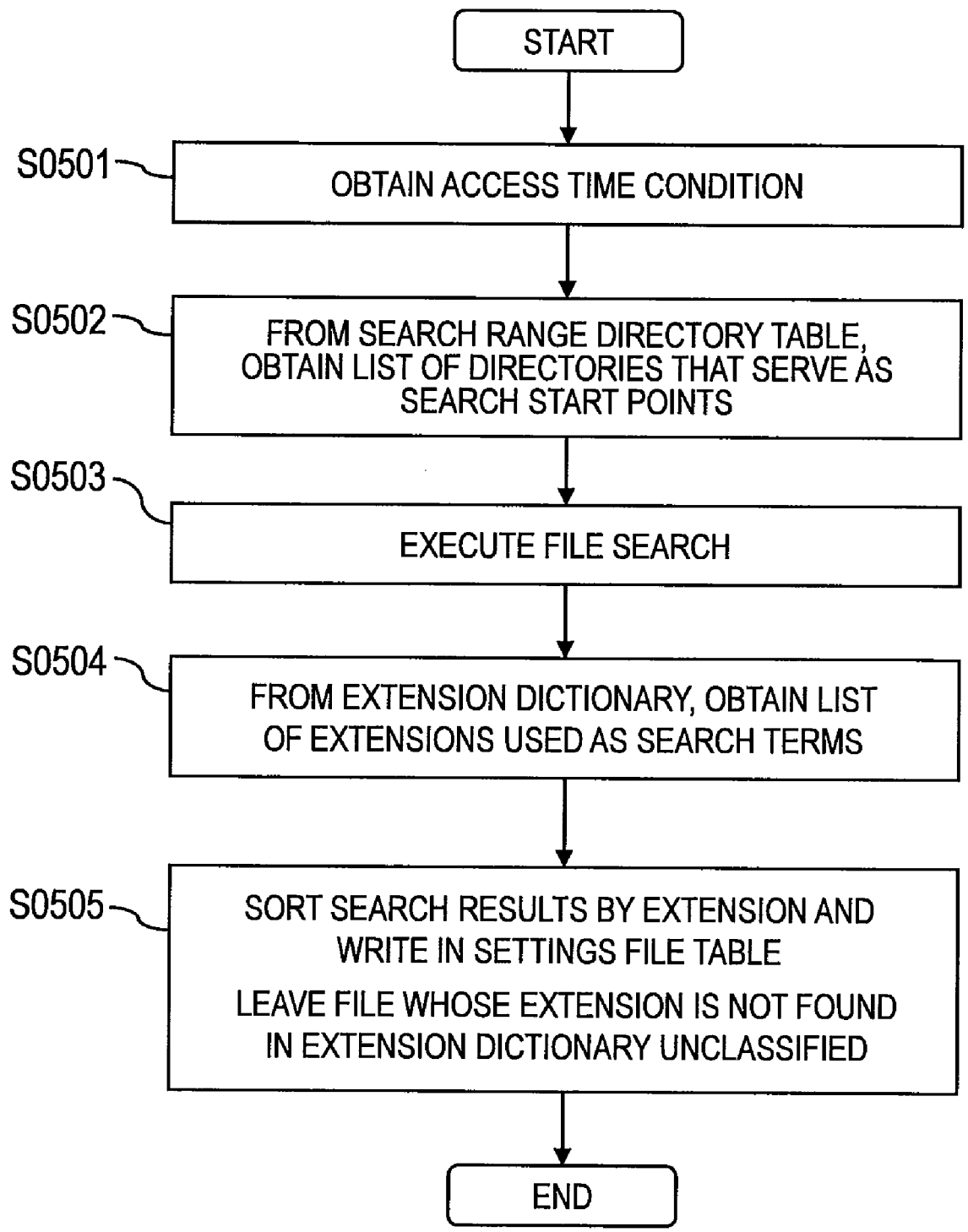
FIG. 19 is a flow chart showing a procedure of searching for a settings file of an application in accordance with the first embodiment of this invention.

FIG. 19 is a flow chart showing a procedure of searching for a settings file of an application according to the first embodiment of this invention.

In the file search processing of S0003, files are searched for with the use of file search terms determined in S0001 and S0002, and search results are recorded in a settings file table 600, an example of which is shown in FIG. 20.

FIG. 20 is a diagram showing the settings file table 600 according to the first embodiment of this invention.

The settings file table 600 records a path in a file system for each file found as a result of a search. The settings file table 600 contains in each entry a computer index 602, an application index 604, a file type 606, a settings file path 608, a certainty degree 610, a confirmation flag 612, and an access date/time 614.

The computer index 602 indicates an identifier assigned to each search target computer 122 in which an application is executed. The application index 604 indicates an identifier assigned to each application.

The file type 606 indicates the type of a settings file that is used by an application identified by the application index 604. For example, "config" is set as the file type 606 in the case of system information and other similar settings information, and "log" is set as the file type 606 in the case of log information.

Stored as the settings file path 608 is the file path of a settings file. The certainty degree 610 is a value that indicates the level of association between a recorded file and an application identified by the application index 604 and that indicates how likely the recorded file is to be a settings file of this application. As the confirmation flag 612, whether or not it has been confirmed that the recorded file is a settings file of the application is recorded. The access date/time 614 is a date and time when a settings file indicated by the settings file path 608 has been accessed.

Returning to FIG. 19, the procedure of searching for a settings file of an application will be described.

The CPU 124 of the search computer 120 first obtains the access time condition of the file search which has been determined in S0001 (S0501). The CPU 124 of the search computer 120 also obtains the list of search start point directories determined in S0002 from the search range directory table 500 (S0502).

The CPU 124 of the search computer 120 uses the information obtaining module 16 to send a search request to the operating system 132 of the search target computer 122, to thereby request a search that uses the search terms obtained in S0001 and S0002. A list of file paths that match the search terms is obtained as search results (S0503).

The CPU 124 of the search computer 120 refers to an extension dictionary 700, which will be described later, to obtain the association relation between a file type 702 and a file extension 704 (S0504). The extension dictionary 700 will be described with reference to FIG. 21.

Figure 21:
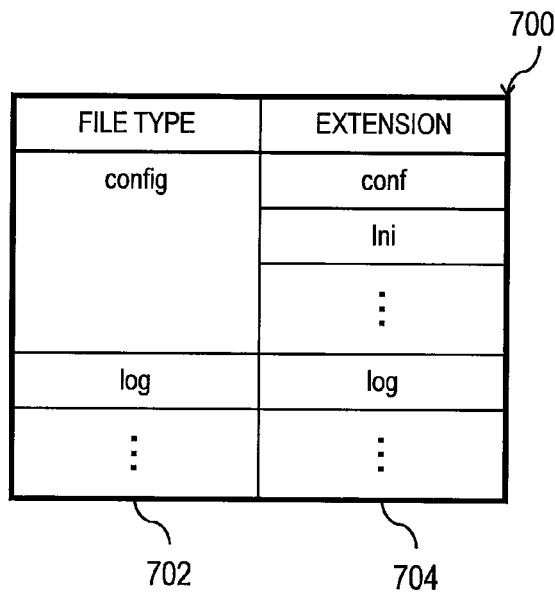
FIG. 21 is an explanatory diagram showing an example of an extension dictionary for obtaining a file type from an extension of a file in accordance with the first embodiment of this invention.

FIG. 21 is a diagram showing an example of the extension dictionary 700 for obtaining a file type from the extension of a file according to the first embodiment of this invention.

The extension dictionary 700 contains in each entry the file type 702 and the file extension 704. The file type 702 can be identified from the file extension 704.

The description returns to the procedure of FIG. 19 of searching for a settings file of an application.

The CPU 124 of the search computer 120 executes the following processing for each file obtained in S0503 (S0505).

The CPU 124 of the search computer 120 first adds a new entry to the settings file table 600 to set the index of the search target computer 122 as the computer index 502 and the index of an application for which the file search is conducted as the application index 604 in the added entry.

The CPU 124 of the search computer 120 next compares the extension of the retrieved file against the file extension 704 obtained in S0504. When there is the extension 704 that matches the extension of the retrieved file, its associated file type 702 is recorded as the file type 606 in an entry of the settings file table 600. When the extension of the retrieved file does not match any extension 704, information indicating "unknown" is recorded as the file type 606. How to calculate a value recorded as the certainty degree 610 will be described in detail in the next step (S0004). Recorded as the access date/time 614 is the access date/time attribute value of this file at present.

S0503 and S0504 may be executed concurrently. For example, the file extension list obtained in S0504 may be added to the search terms in S0503 to be used in the file search.

(S0004: Certainty Degree Calculation)

The certainty degree calculation processing (S0004) is for calculating values to be recorded as the certainty degree 610 in the entries of the settings file table 600 created in S0003. Rules for calculating the certainty degree 610 are shown below:

Firstly, the certainty degree 508 in an entry of the search range directory table 500 is used as the initial value. For example, the search range directory table 500 has an entry whose start point directory 506 is "/A/B/C" and certainty degree 508 is "10". A file search is executed in S0003 with the start point directory of this entry, "/A/B/C" as a start point, and a settings file "/A/B/C/D/eee.conf" is found as a result of the search. Then the initial value of the certainty degree of the obtained settings file is the certainty degree of the search start point directory "/A/B/C", namely, "10".

Secondly, file search processing is executed a plurality of times for the same application and a high degree of certainty is set to files that are found more than once through the a plurality of searches. However, searches that share the same application activation time are regarded as the same search processing.

Thirdly, when the path of a retrieved file contains a specific keyword, a high degree of certainty is set to the file. For example, a file that contains "conf" or "config" in its path is likely to be a settings file and is given a high degree of certainty.

Fourthly, the degree of certainty of a retrieved file is set high when the type of the file is settings file and the time difference between the file's access date/time and the application activation time is very small.

A specific description will be given below on a procedure of determining the certainty degree of a file in accordance with the above-described rules.

Figure 22:
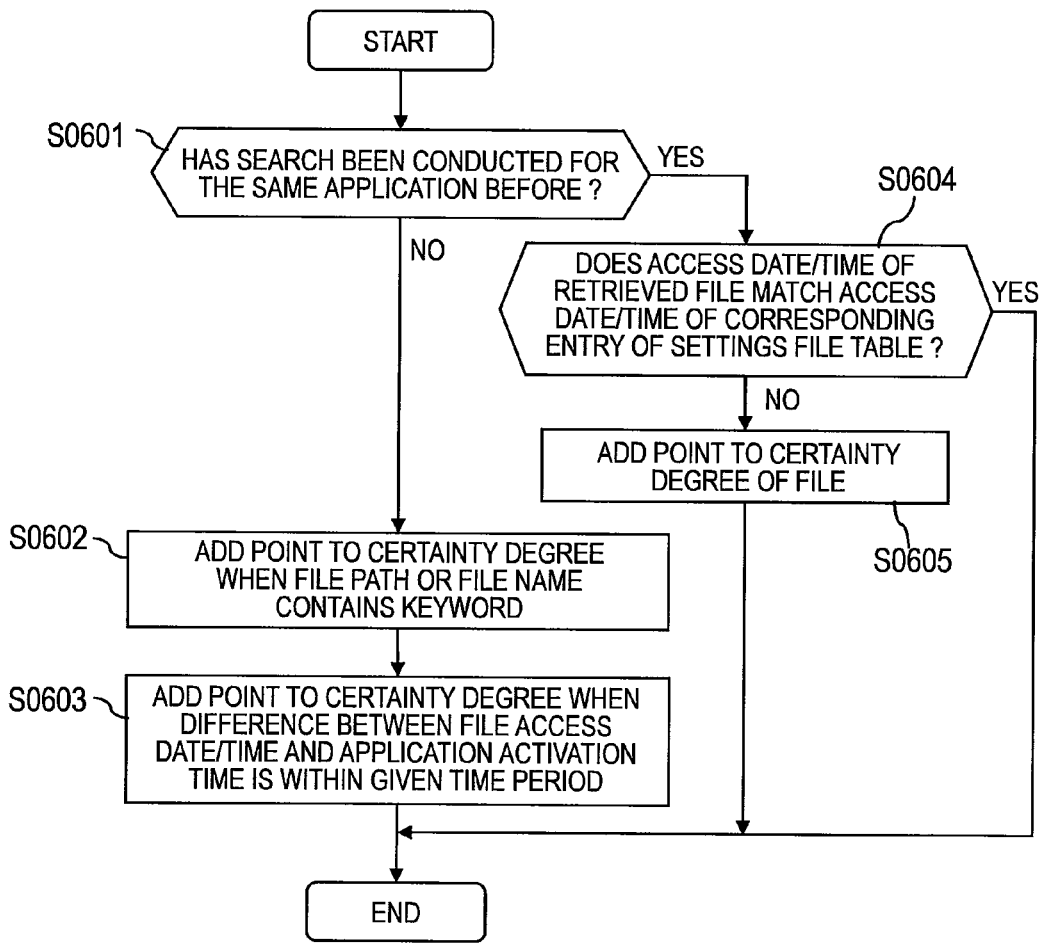
FIG. 22 is a flow chart showing a procedure of calculating a certainty degree of a retrieved file in accordance with the first embodiment of this invention.

FIG. 22 is a flow chart showing a procedure of calculating the certainty degree of a retrieved file according to the first embodiment of this invention.

The CPU 124 of the search computer 120 judges whether or not a search has been executed for a settings file of an application for which a file search is to be conducted (S0601). This is accomplished by judging whether or not the settings file table 600 has an entry for this application since the presence of the entry indicates that the search has been conducted in the past.

In the case where a search has not been executed for a settings file of an application for which a file search is to be conducted (the answer to S0601 is "No"), the CPU 124 of the search computer 120 newly calculates a degree of certainty (S0602). In S0602, the initial value is set first in accordance with the above-described first rule, and a certainty degree is calculated in accordance with the third rule.

To describe S0602 specifically, the file type 606 of a file on which certainty degree calculation is performed is first obtained from the settings file table 600. Next, every entry whose file type 802 matches the obtained file type 606 is obtained from a certainty degree calculation keyword table 800, which will be described later with reference to FIG. 23. When a keyword 806 of the obtained entry is contained in the path of the file on which certainty degree calculation is performed, the file's certainty degree 610 in the settings file table 600 is updated based on points registered as an added/subtracted point 804.

Figures 23, 24:
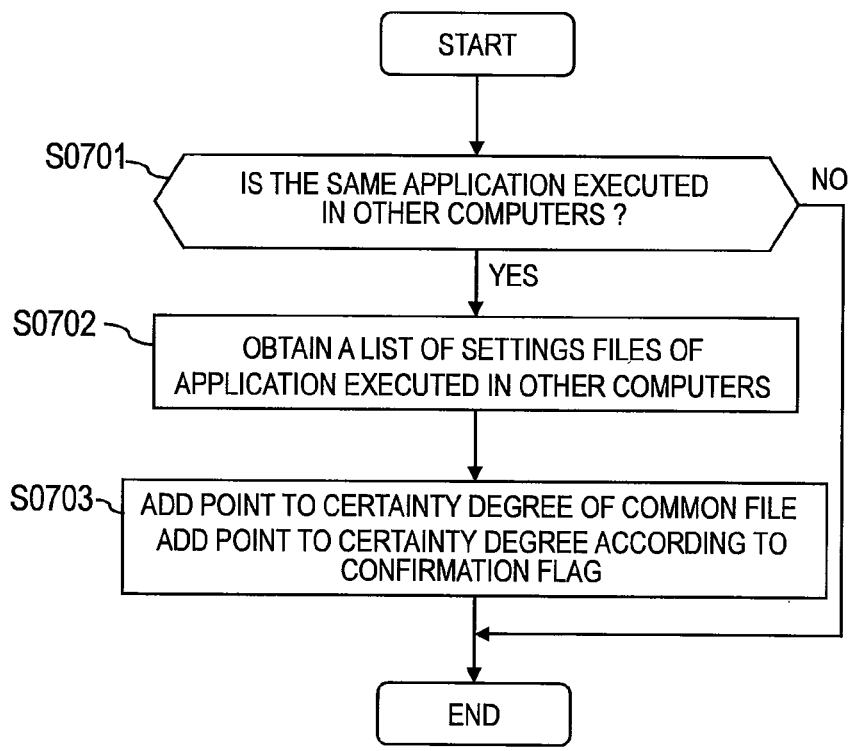
FIG. 23 is an explanatory diagram showing an example of a certainty degree calculation keyword table in accordance with the first embodiment of this invention.
FIG. 24 is a flow chart showing a modification example of a procedure of calculating a certainty degree of a retrieved file in accordance with the first embodiment of this invention.

FIG. 23 is a diagram showing an example of the certainty degree calculation keyword table 800 according to the first embodiment of this invention.

The certainty degree calculation keyword table 800 contains in each entry the file type 802, the added/subtracted point 804, and the keyword 806.

The file type 802 indicates the type of a file on which certainty degree calculation is performed. The file type 802 is, as described above, determined in association with the extension of the file.

The added/subtracted point 804 indicates whether a value is to be added to or subtracted from the certainty degree of a file when the file type 802 matches the file type 606 and the file path of the file contains the keyword 806, which will be described later. A value actually added or subtracted may be set as the added/subtracted point 804. When a negative value is set as the added/subtracted point 804 in an entry, the value set as the added/subtracted point 804 is always added to the certainty degree of a file that matches the file type 802 and keyword 806 of this entry.

The keyword 806 is a character string that makes a file likely or unlikely to be a settings file when included in the path of the file.

The description returns to the procedure of FIG. 22 of calculating the certainty degree of a settings file.

The CPU 124 of the search computer 120 calculates the difference between the access date/time of the file on which certainty degree calculation is performed and the activation time of the application for which a file search is conducted and, when the difference is within a given period of time, increases the certainty degree 610 of the file's entry in the settings file table 600 (S0603). The certainty degree calculation in S0603 follows the fourth rule described above.

In the case where a search has been executed for a settings file of an application for which a file search is to be conducted (the answer to S0601 is "Yes"), the CPU 124 of the search computer 120 compares the access date/time 614 of an entry in the settings file table 600 that holds the identifier of the application for which a file search is to be conducted against the access date/time of this settings file (S0604).

When the access date/time 614 of an entry in the settings file table 600 that holds the identifier of the application for which a file search is to be conducted does not match the access date/time of the settings file retrieved in S0003 (the answer to S0604 is "No"), the CPU 124 of the search computer 120 increases the certainty degree 610 of this file (S0605). The certainty degree calculation in S0604 follows the second rule described above.

When the access date/time 614 of an entry in the settings file table 600 that holds the identifier of the application for which a file search is to be conducted matches the access date/time of the settings file retrieved in S0003 (the answer to S0604 is "Yes"), the CPU 124 of the search computer 120 ends this processing.

Modification Example of S0004

Certainty Degree Calculation

A partially modified procedure of the processing of FIG. 22 of calculating the certainty degree of a file will be described.

FIG. 24 is a flow chart showing a modification example of the procedure of calculating the certainty degree of a retrieved file according to the first embodiment of this invention.

The modification example shown in FIG. 24 is a case in which the same application is executed in a plurality of search target computers 122 and a high degree of certainty is set to a file that is included in file search results of two or more of the search target computers 122.

The CPU 124 of the search computer 120 judges from the application index 302 of the application configuration table 300 whether or not the application for which a file search is to be conducted is executed in other computers than the search target computer (S0701). When there are no such computers (the answer to S0701 is "No"), this processing is ended.

When the application for which a file search is to be conducted is executed in other computers than the search target computer (the answer to S0701 is "Yes"), the CPU 124 of the search computer 120 obtains every entry that holds the identifier of the application for which a file search is to be conducted from the settings file table 600 (S0702).

The CPU 124 of the search computer 120 adds a value that is written in the entry obtained in S0702 to the certainty degree of the settings file on which certainty degree calculation is performed (S0703). In the case where no entry has been obtained in S0702, the opposite may be done by subtracting a value from the certainty degree of the settings file. The confirmation flag 612 of the entry obtained in S0702 is referred to and, when the confirmation flag 612 indicates that the file has been confirmed, the confirmation flag 612 of the entry for the settings file on which certainty degree calculation is performed is also set to a value indicating a "confirmed" state.

(S0005: Confirmation Processing)

In the confirmation processing (S0005), the settings files retrieved in S0003 are presented to the user of the system along with the certainty degrees calculated in S0004. The confirmation processing also receives an input of approval or disapproval of the search results from the user of the system to improve the search result reliability.

A specific description will be given below on the procedure of the confirmation processing.

Figure 25:
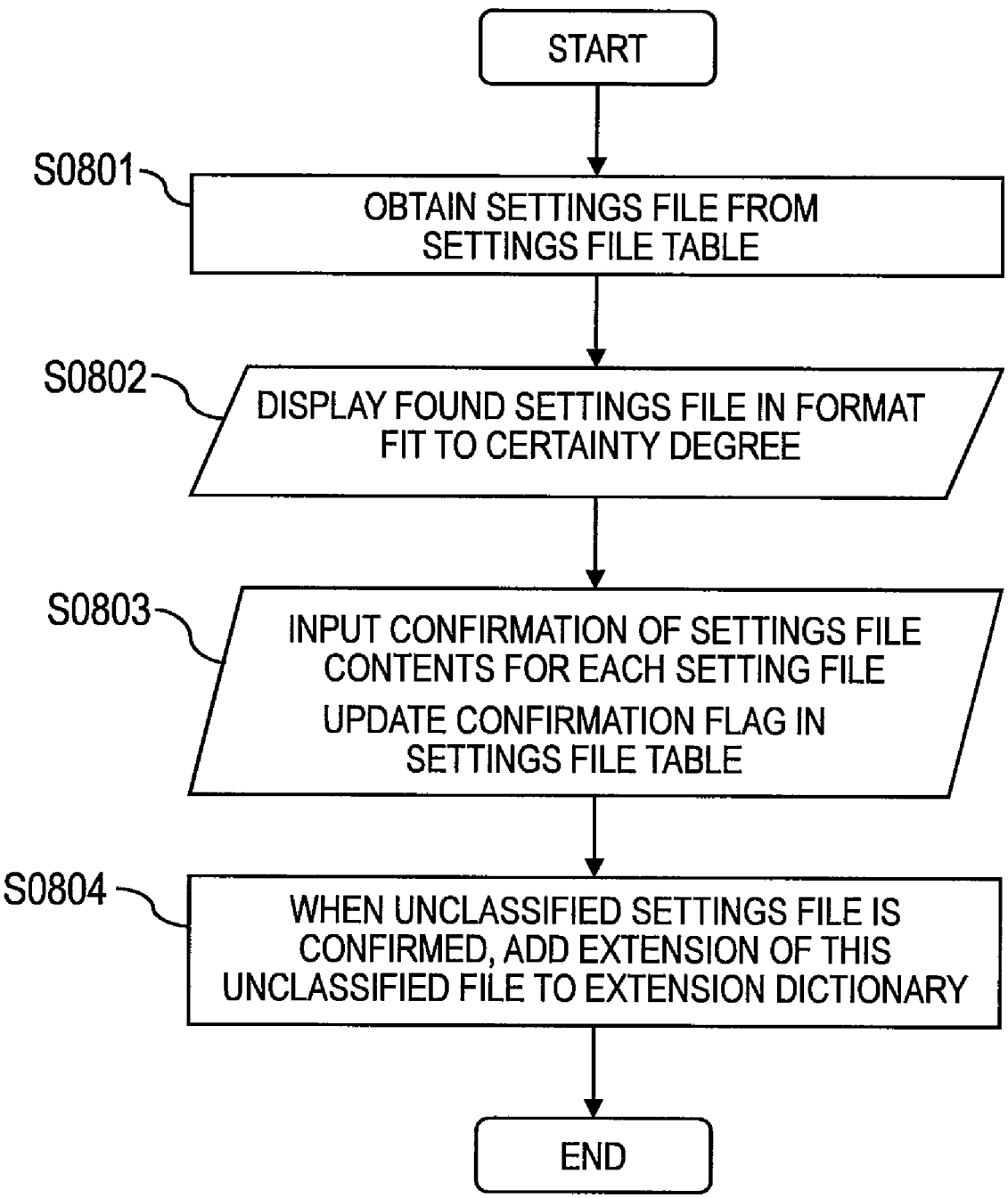
FIG. 25 is a flow chart showing a procedure of confirming a retrieved file in accordance with the first embodiment of this invention.

FIG. 25 is a flow chart showing the procedure of processing of confirming a retrieved file according to the first embodiment of this invention.

The CPU 124 of the search computer 120 first obtains every entry within the display range from the settings file table 600 (S0801). For example, when the display range covers specific applications of specific computers, entries of these applications are identified from the computer index 602 and application index 604 of the settings file table 600.

The CPU 124 of the search computer 120 next displays data in the entry obtained in S0801 to the user of the system (S0802). The display format is changed to suit data recorded as the confirmation flag 612 or the certainty degree 610. For example, entries in which the confirmation flag 612 indicates an "unconfirmed" state and entries in which the confirmation flag 612 indicates a "confirmed" state are displayed separately. Alternatively, the displayed values of the certainty degree 610 may be color-coded so that the user of the search system can understand the degree of certainty of a file with one look.

The CPU 124 of the search computer 120 receives an input from the user of the search system about whether settings files of an application for which a file search has been conducted have successfully been retrieved (S0803). The user of the search system refers to the information displayed in S0802 to check whether or not necessary files have correctly been found, and enters confirmation about a correctly found file (for example, by operating an "OK" button). Receiving the confirmation input through the display/input module 10, the CPU 124 of the search computer 120 updates the confirmation flag 612 of the confirmed file to a "confirmed" state.

Lastly, in the case where the file type of 606 of a file for which confirmation has been entered is unknown, the CPU 124 of the search computer 120 requests the user of the system to specify the file type 606 (S0804). The CPU 124 of the search computer 120 simultaneously creates an entry in the extension dictionary 700 to record the specified file type 606 and the extension of this file as the file type 702 and the extension 704, respectively. This enhances the extension dictionary 700 in preparation for the next and subsequent searches.

Figure 26:
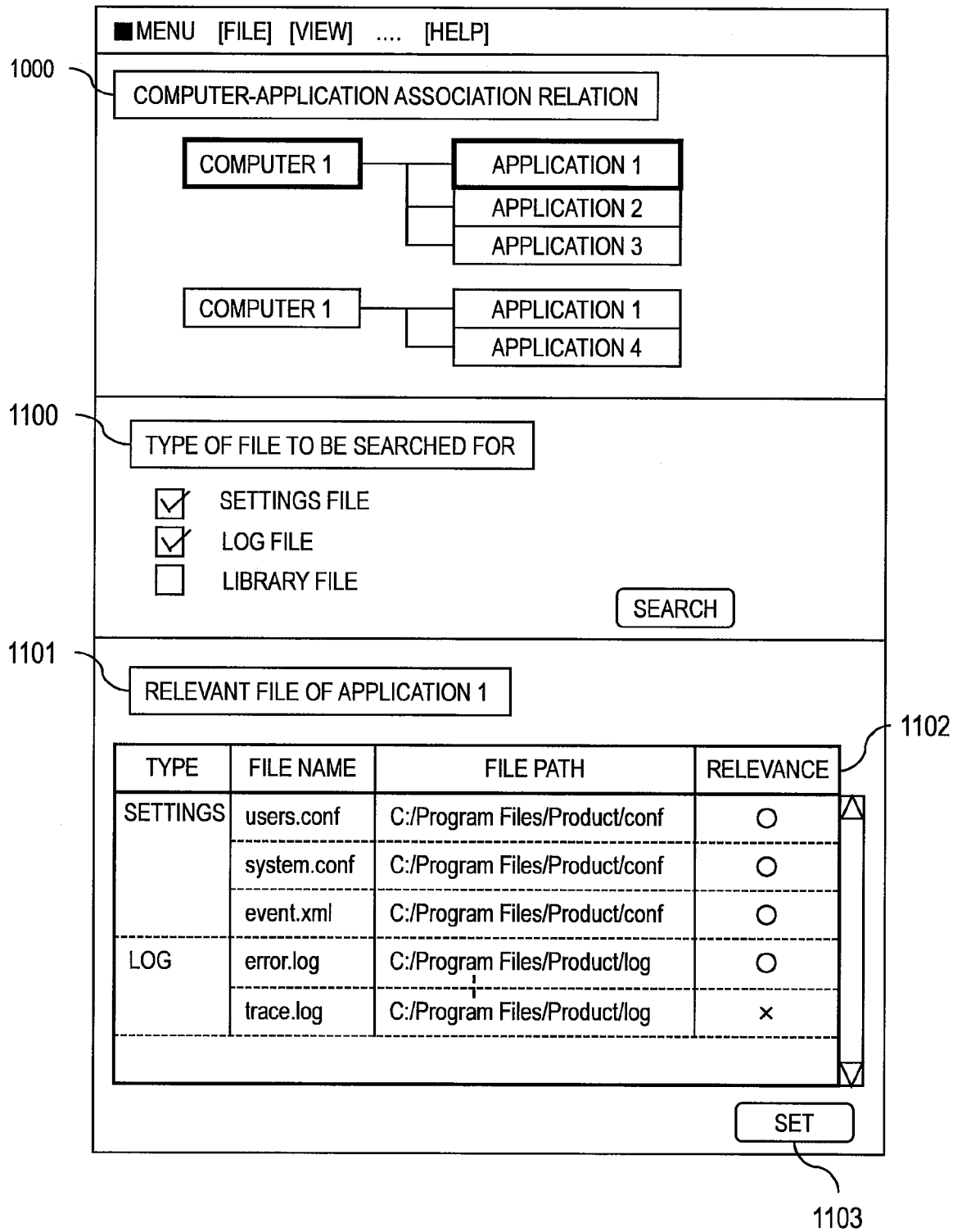
FIG. 26 is an explanatory diagram showing an example of an input window for confirmation processing by a user of the search system in accordance with the first embodiment of this invention.

FIG. 26 is a diagram showing an example of an input window for confirmation processing by a user of the system according to the first embodiment of this invention.

The confirmation processing input window is the window displayed in S0803 of the flow chart of FIG. 25. Components of the confirmation processing input window include a search target computer-application association relation display section 1000, a searched-for file type setting section 1100, and a relevant file setting section 1101.

The search target computer-application association relation display section 1000 displays the association relation between the search target computer 122 and an application executed in this computer.

The searched-for file type setting section 1100 contains a portion for setting the type of a file to be searched for and a search execution button. The file type setting portion may display predetermined file types, or may display a list of files found as a result of a search for relevant files of a specified application. Checkboxes are used to specify a file type. Operating the search execution button starts a search for files of the type specified in the searched-for file type setting section 1100.

The relevant file setting section 1101 has a confirmation input box 1102 for each file found as a result of a search. The user inputs information indicating whether the file is relevant to the application (expressed by the circular mark in the drawing) or not (expressed by the cross mark in the drawing) in the confirmation input box 1102, and operates a "set" button 1103 lastly to set the entered information.

When the entered information is set, the relevant file setting section 1101 displays files that have been confirmed to be relevant to the application, or files that have yet to be confirmed of their relevance to the application, but not files that have been confirmed to be irrelevant to the application.

Figure 27:
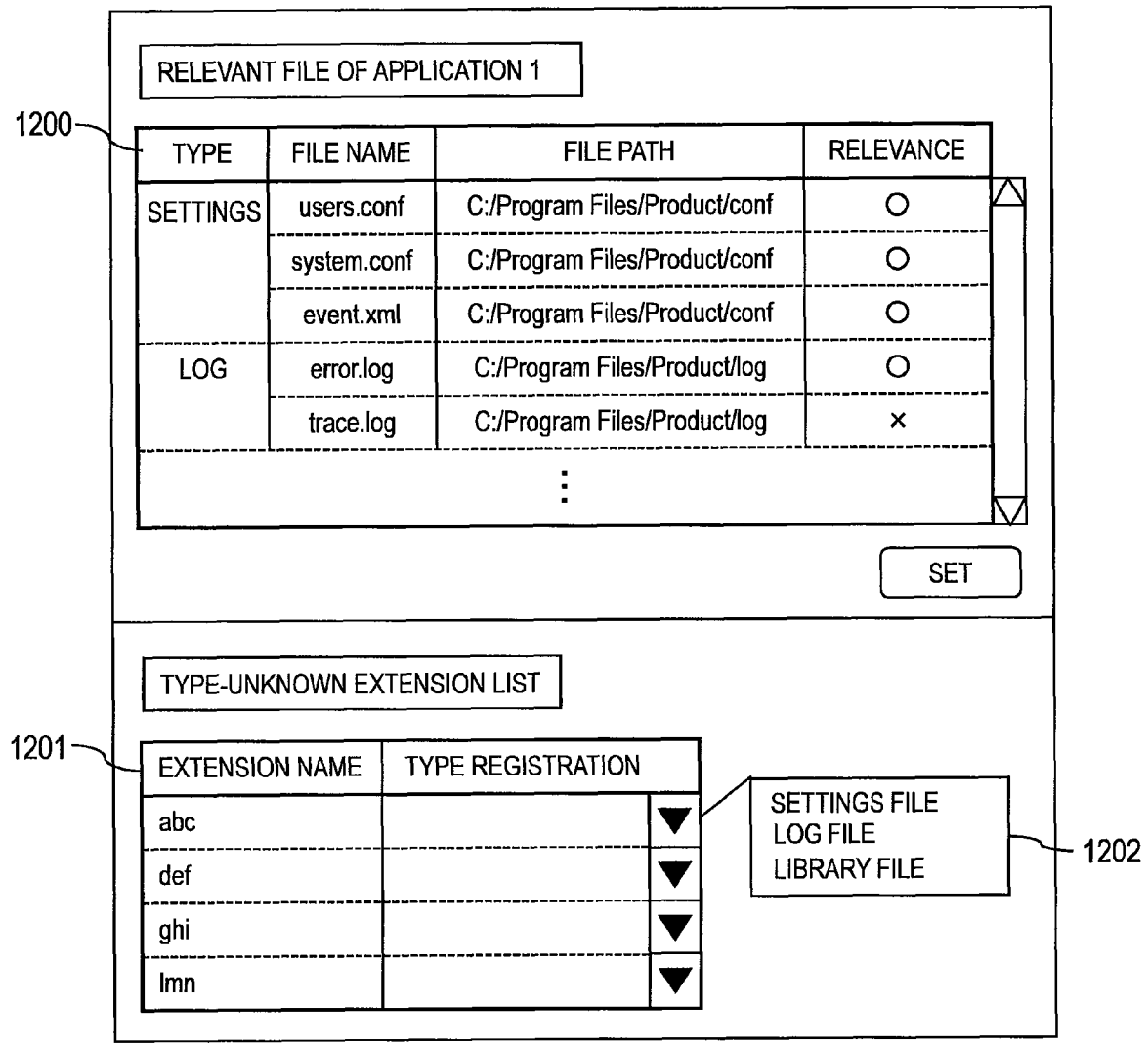
FIG. 27 is an explanatory diagram showing an example of a registration window of the extension dictionary in accordance with the first embodiment of this invention.

FIG. 27 is a diagram showing an example of a registration window of the extension dictionary 700 according to the first embodiment of this invention.

The registration window of the extension dictionary 700 is displayed in S0804 of the flow chart of FIG. 25. A relevant file table 1200 and a type-unknown extension table (list) 1201 are displayed in the registration window of the extension dictionary 700.

The relevant file table 1200 shows files that have been retrieved by a file search of an application specified to be displayed and whose types are known because extensions have been registered in the extension dictionary 700 in association with the file types. The unknown extension table 1201, on the other hand, shows files found as a result of the search whose extensions have not been registered in the extension dictionary 700. The type-unknown extension table 1201 provides file type candidates to extensions associated with unknown file types. The user chooses an extension from the type-unknown extension table 1201, chooses a file type from a registrable file type list 1202, and associates the chosen extension and file type with each other. When a file type associated with an extension is specified, files having this extension are additionally displayed in the relevant file table 1200.

Modification Example in which File Search Processing is Performed on a Plurality of Computers In the above description of the first embodiment of this invention, a file search is executed in each search target computer 122 separately. The description given below is about a procedure of searching a plurality of computers at once in a single execution of file search processing.

Figure 28:
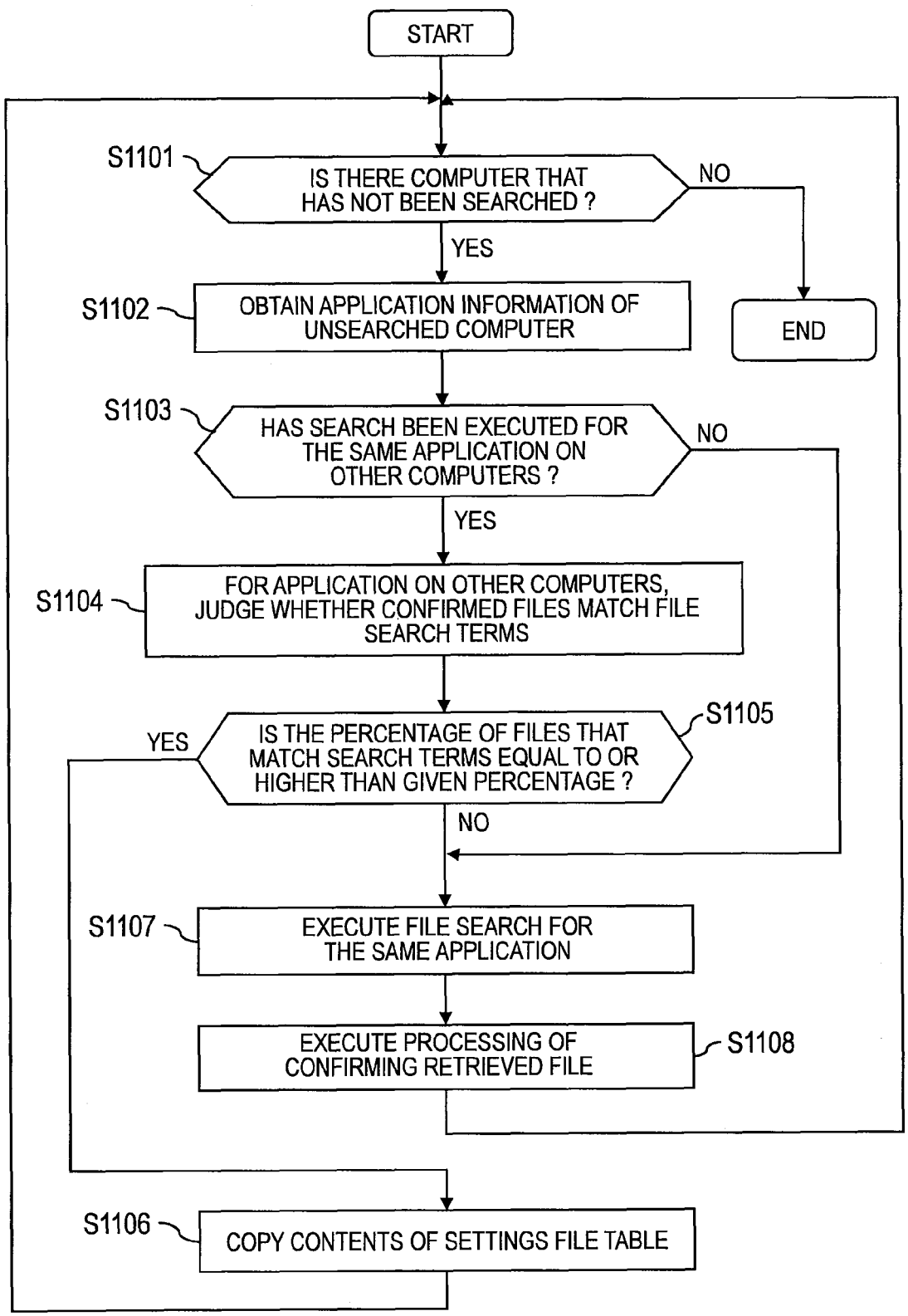
FIG. 28 is a flow chart showing a procedure of searching for settings files that are stored separately in a plurality of computers in accordance with the first embodiment of this invention.

FIG. 28 is a flow chart showing a procedure of searching for settings files that are stored separately in a plurality of computers according to the first embodiment of this invention.

The CPU 124 of the search computer 120 receives an input specifying a plurality of search target computers 122, sequentially selects computers that have not been searched for files from among the specified search target computers 122, and judges whether or not a computer in which a file search has not been executed is included (S1101). Whether or not a file search has been executed can be judged from, for example, the presence or absence of an entry for the search target computer 122 in question in the application configuration table 300. When there is no computer in which a file search has not been executed (the answer to S1101 is "No"), this processing is ended.

The CPU 124 of the search computer 120 executes the pre-processing described above in the search target computer 122 selected in S1101 to obtain information about applications run on this search target computer 122 and create entries in the application configuration table (S1102).

The CPU 124 of the search computer 120 extracts one of the applications obtained in S1102 (hereinafter referred to as "own application"), and searches the application configuration table 300 with the extracted application as a key to judge whether or not the same type of application is executed in other search target computers 122 (S1103).

In the case where the same type of application is executed in other search target computers 122 (the answer to S1103 is "Yes"), the CPU 124 of the search computer 120 obtains from the settings file table 600 a list of files relevant to an application obtained in S1103 as the same type of application that runs on other search target computers 122 (hereinafter referred to as "others' application"). When the same type of application as the own application is executed in other search target computers 122 and S1104 is executed in the second and subsequent search target computers 122, file search processing has already been executed for this application through S1107, which will be described later.

The CPU 124 of the search computer 120 further checks, for each file on the file list, whether or not the file search terms are matched in the first search target computer 122, too, for example, whether or not the file exists and whether or not the file has been accessed after the activation time of the own application (S1104).

The CPU 124 of the search computer 120 evaluates whether or not the number of files that meet the check conditions reaches a given percentage of the total number of the files checked in S1104 or higher (S1105).

In the case where the number of files that meet the check conditions reaches a given percentage or higher (the answer to S1105 is "Yes"), the CPU 124 of the search computer 120 adds an entry to the settings file 600 for each of the files that meet the check conditions of S1104 (S1106). This entry addition is accomplished by making a copy of an entry of the settings file 600 that is about a file relevant to the others' application, and overwriting the computer index 602 of the copy entry with the index of the first search target computer 122.

In the case where the number of files that meet the check conditions does not reach a given percentage (the answer to S1105 is "No"), the CPU 124 of the search computer 120 regards the judgment that the own application and the others' application are of the same type as false.

The CPU 124 of the search computer 120 executes the file search processing of S0003 described above for the application whose files are to be searched for in the case where the same type of application is not executed in other search target computers 122 (the answer to S1103 is "No"), or in the case where the number of files that meet the check conditions does not reach a given percentage (the answer to S1105 is "No") (S1107).

The CPU 124 of the search computer 120 performs the confirmation processing of S0005 on files found as a result of the file search processing in S1107 (S1108).

(Temporary Preservation of File Attributes)

In some types of file system, the access date/time of a file is updated by a file search. A file search according to this invention therefore has a possibility of updating the access date/time due to access made by the file search. This unintended updating of the file access date/time is avoided by the processing described below in which attributes information of a file that may be accessed during a file search is temporarily saved at the start of the file search and the saved file access date/time is written back to the file system after the search processing is finished.

Figure 29:
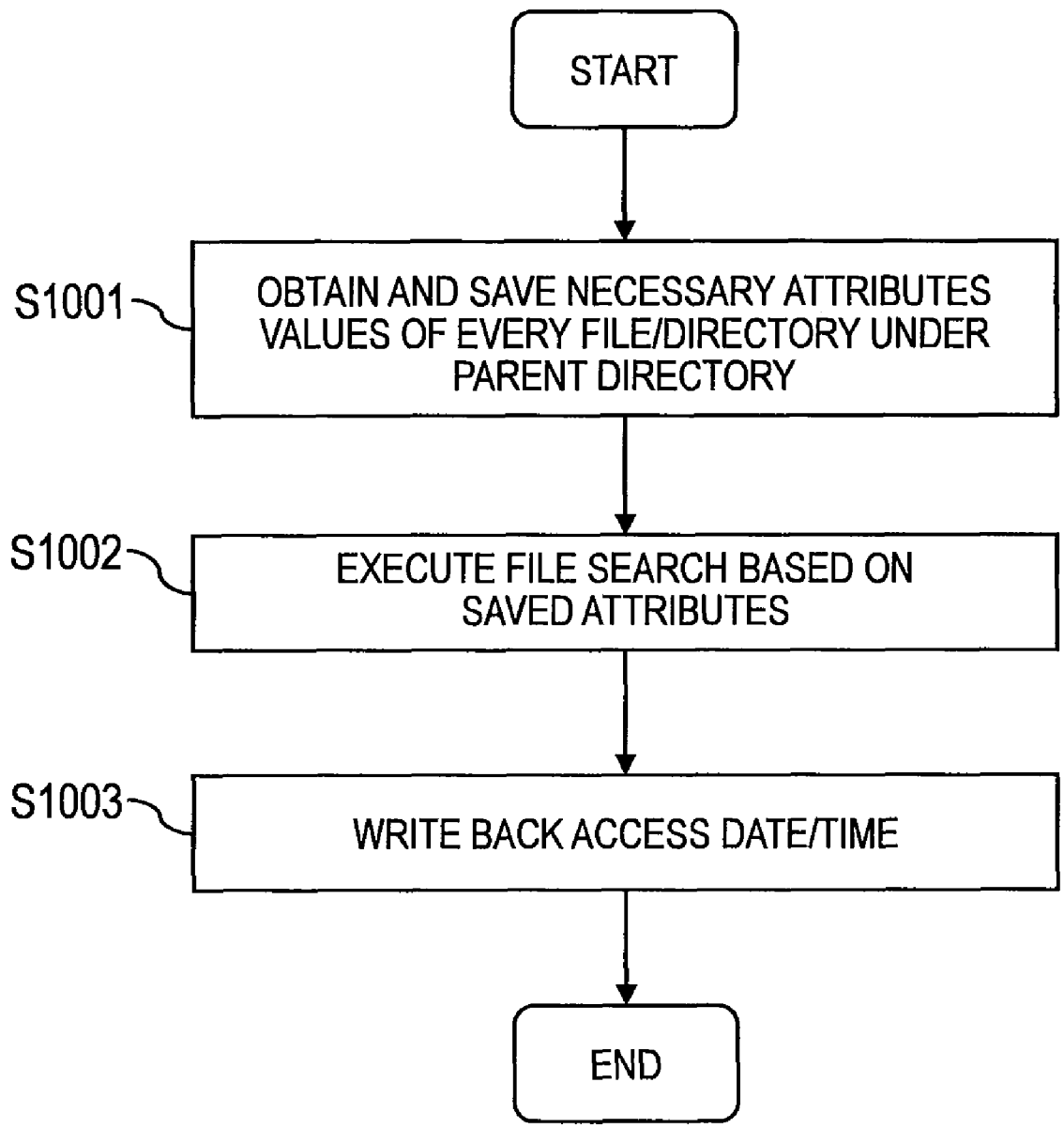
FIG. 29 is a flow chart showing a procedure of keeping a file access time upon conducting a settings file search in accordance with the first embodiment of this invention.

FIG. 29 is a flow chart showing a procedure of keeping a file access time upon conducting a settings file search according to the first embodiment of this invention.

The CPU 124 of the search computer 120 obtains attributes information (for example, file path, creation date/time, access date/time) of every file and directory under the parent directory of an application, and saves the information on a file/directory basis (S1001).

The CPU 124 of the search computer 120 executes the file search processing (S0002, S0003) using the file attributes information saved in S1001 (S1002).

Lastly, the CPU 124 of the search computer 120 writes the file/directory access date/time saved in S1001 back to the original file (S1003).

To give a more detailed description about when to execute the respective steps, the file attributes information saving processing (S1001) is executed immediately before files are accessed, for example, after S0204 of FIG. 12. The access date/time write back processing (S1003) is executed after the file search processing is finished, for example, after S0505 of FIG. 19 or S0603 of FIG. 22.

(Effects of the First Embodiment of this Invention)

According to the first embodiment of this invention, a settings file of an application can be searched for efficiently by identifying a directory relevant to the application such as the application's install directory, and searching the identified directory for a settings file. This enables a user who does not have much knowledge about an application to easily locate the storage place of a file relevant to the application.

Second Embodiment

Whereas the first embodiment of this invention places all of the programs that execute search processing in the search computer, a part of the search processing is executed in each search target computer in a second embodiment of this invention.

Figure 30:
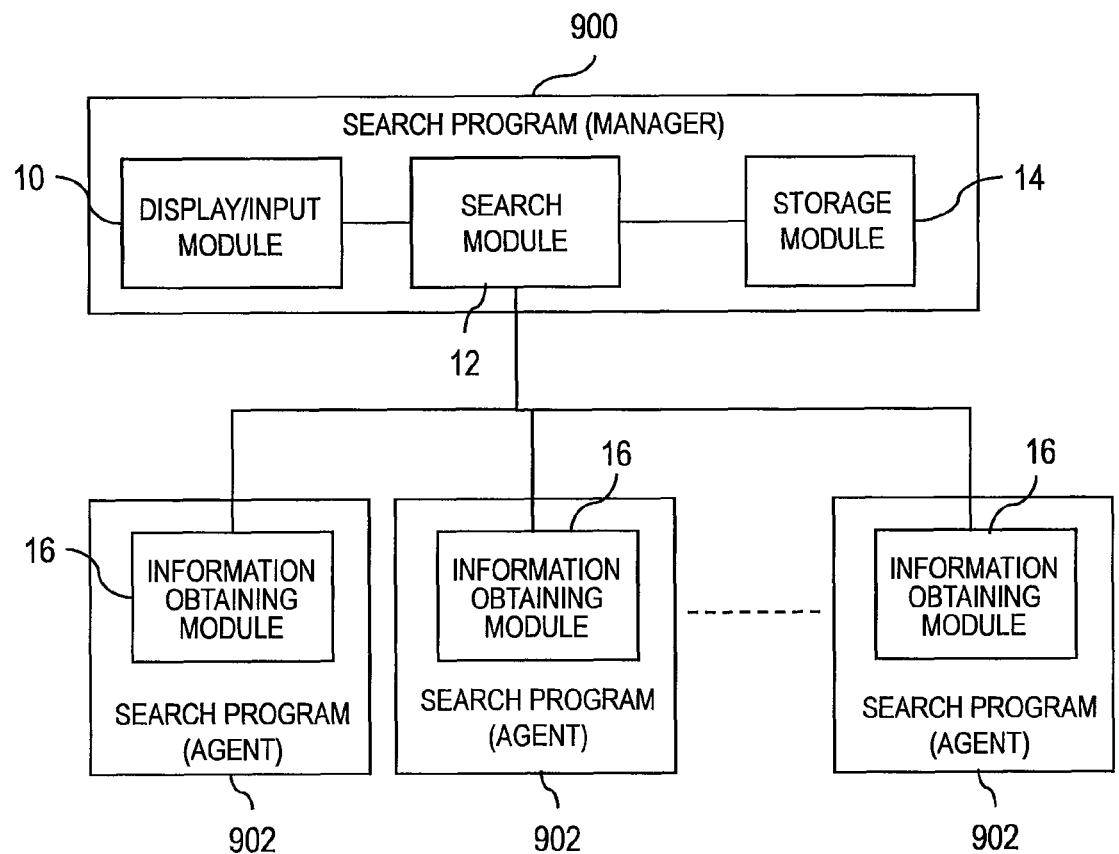
FIG. 30 is a block diagram showing an overall configuration of a search system in accordance with a second embodiment of this invention.

FIG. 30 is a block diagram showing the overall configuration of a search system according to a second embodiment of this invention.

The search system according to the second embodiment of this invention contains a search program manager 900 executed in the search computer and a search program agent 902 executed in each search target computer. The search program (manager) 900 and the search program (agent) 902 have a manager-agent configuration.

The search program manager 900 contains the display/input module 10, the search module 12, and the storage module 14. The search program agent 902 contains the information obtaining module 16. The display/input module 10, the search module 12, the storage module 14, and the information obtaining module 16 in the second embodiment are the same as those in the first embodiment of this invention which are shown in FIG. 1.

The display/input module 10, the search module 12, the storage module 14, and the information obtaining module 16 in the first embodiment of this invention are installed as a single search program. In the second embodiment of this invention, the functions of the modules are divided between two programs such that the display/input module 10, the search module 12, and the storage module 14 are implemented by the search program (manager) 900 whereas the information obtaining module 16 is implemented by the search program (agent) 902.

Figure 31A:
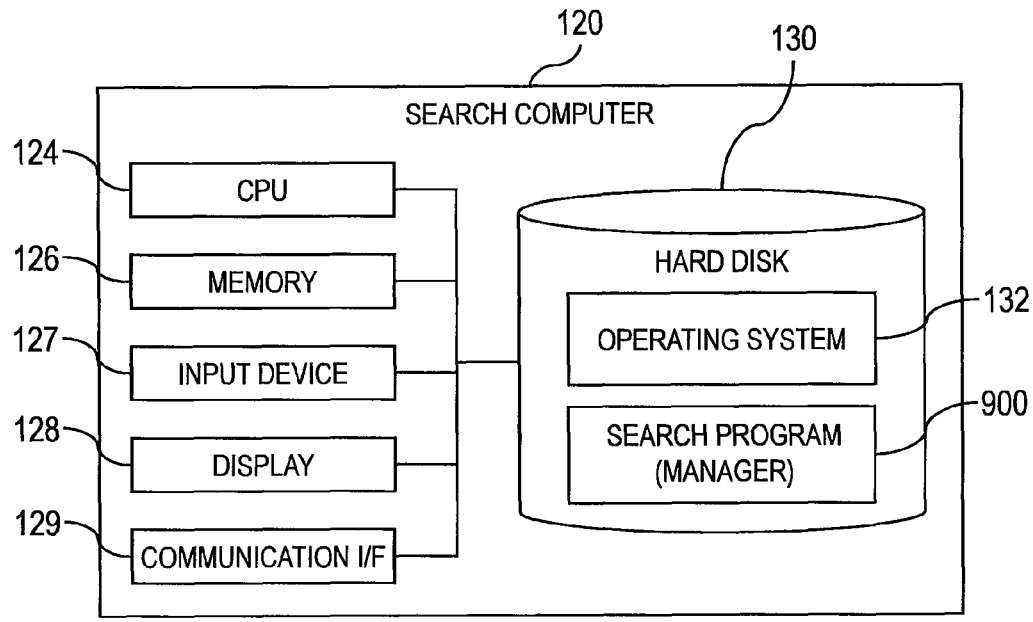
FIG. 31A is a block diagram showing a hardware configuration of a search computer in accordance with the second embodiment of this invention.

FIG. 31A is a diagram showing the hardware configuration of the search computer according to the second embodiment of this invention.

The hardware configuration of the search computer according to the second embodiment of this invention is the same as that of the search computer according to the first embodiment of this invention. The only difference is that, as has been described with reference to FIG. 30, the search program stored in the hard disk 130 in the second embodiment is the search program (manager) 900.

Figure 31B:
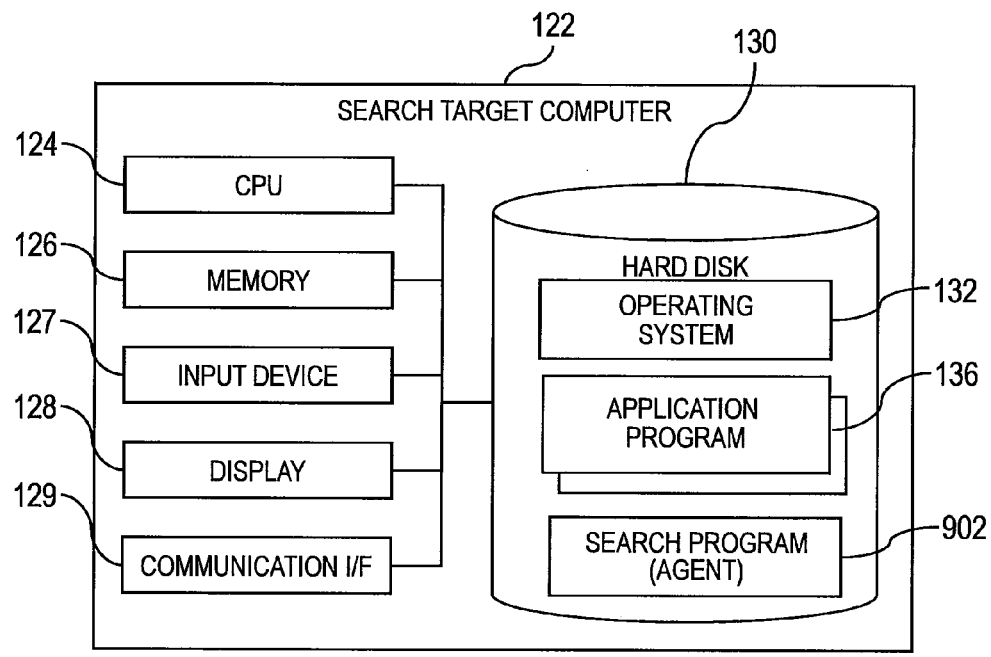
FIG. 31B is a block diagram showing a hardware configuration of each search target computer in accordance with the second embodiment of this invention.

FIG. 31B is a diagram showing the hardware configuration of each search target computer according to the second embodiment of this invention.

The hardware configuration of the search target computer according to the second embodiment of this invention is the same as that of the search target computer according to the first embodiment of this invention. The only difference is that, as has been described with reference to FIG. 30, the hard disk 130 in the second embodiment newly stores the search program (agent) 902.

In the second embodiment of this invention where a single program is divided into a manager and an agent, the basic operation of the programs is the same as in the first embodiment of this invention.

(File Search from Process Monitoring)

The assumption in the first embodiment of this invention is that the user of the search system specifies for which application a file search is to be conducted. In the second embodiment of this invention, on the other hand, the search program (agent) 902 resident in the search target computer 122 monitors the activation of a new application regularly. Accordingly, when a new application is activated, a search for a settings file can be started immediately. A specific processing procedure thereof is shown in FIG. 32.

Figure 32:
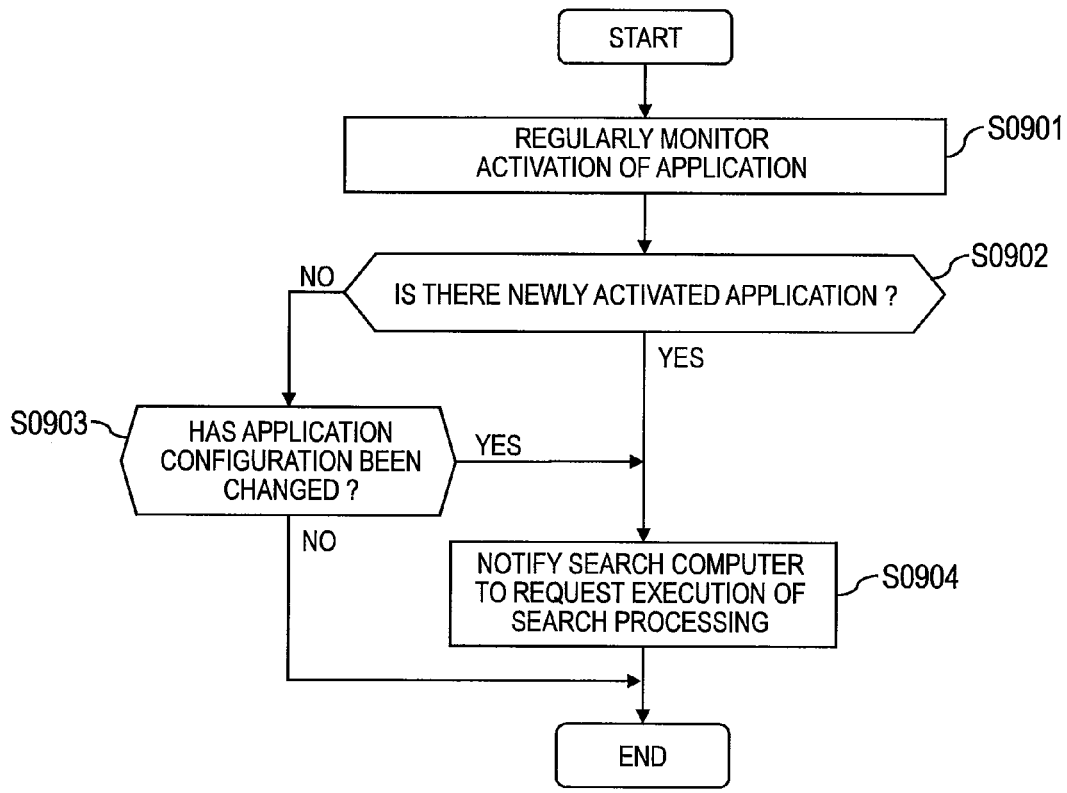
FIG. 32 is a flow chart for starting file search processing from process monitoring in accordance with the second embodiment of this invention.

FIG. 32 is a flow chart for starting file search processing from process monitoring according to the second embodiment of this invention.

The CPU 124 of the search target computer 122 executes the search program (agent) 902, to thereby regularly obtain information from the operating system 132 of the search target computer 122 about a process run in its own computer (S0901).

The CPU 124 of the search target computer 122 creates a process-application association relation based on the obtained process information. The CPU 124 of the search target computer 122 also judges whether or not an application associated with the obtained process information is a newly activated application (S0902). Whether it is a newly activated application or not can be judged from whether or not the application configuration table 300 has an entry for this application.

In the case where the application is a newly activated one (the answer to S0902 is "Yes"), the CPU 124 of the search target computer 122 notifies the search computer 120 of the fact that a new application has been activated, and requests the search computer 120 to execute a search (S0904). Notified of the activation of a new application, the search computer 120 executes processing of searching for a settings file of this application.

In the case where the application is not a newly activated one (the answer to S0902 is "No"), the CPU 124 of the search target computer 122 obtains a value written as the process ID 306 in association with this application in the application configuration table 300, and compares the obtained process ID 306 with the process ID of the activated application (S0903).

When the process ID 306 obtained from the application configuration table 300 matches the process ID of the activated application (the answer to S0903 is "Yes"), the CPU 124 of the search target computer 122 judges that no changes have been made to the application, and ends this processing. When the process ID 306 obtained from the application configuration table 300 differs from the process ID of the activated application (the answer to S0903 is "No"), there is a possibility that some changes have been made to the application, and the CPU 124 of the search target computer 122 requests the search computer 120 to execute a file search again (S0904).

The search computer 120 may accumulate notified applications to search for settings files of the accumulated applications upon instruction from the user.

(Effects of the Second Embodiment of this Invention)

According to the second embodiment of this invention, monitoring the activation of an application by the search target computer 122 makes it unnecessary for a user to regularly specify an application in searching for a settings file, and thus reduces the management cost.

Also, according to the second embodiment of this invention, the user is notified by the search target computer 122 of an application whose configuration has been changed, and can find the latest location of a settings file all the time.

This invention is applicable to software products for managing an information processing system or management devices for managing an information processing system.

While the present invention has been described in detail and pictorially in the accompanying drawings, the present invention is not limited to such detail but covers various obvious modifications and equivalent arrangements, which fall within the purview of the appended claims.

What is claimed is:

1. A file search method executed in a file search apparatus for searching for a file relevant to an application, the file search apparatus having an interface, a processor coupled to the interface, and a memory coupled to the processor, the file search method comprising the steps of:

obtaining process information which includes an execution start time and file path of the application;

identifying, from the obtained file path, a directory that serves as a start point in a search for a file relevant to the application, wherein the step of identifying a directory that serves as a start point in a search for a file relevant to the application includes the step of:

setting a directory above a directory that stores the application as a parent directory based on the obtained file path;

setting a directory that is created in the parent directory and that is contained in the obtained file path as a child directory;

setting other directories created in the parent directory than the child directory as brother directories;

comparing a creation time of the child directory with creation times of the brother directories;

identifying the parent directory as the directory that serves as a start point in a search for a file relevant to the application in a case of which all of the brother directories have been created within a given period of time from the creation time of the child directory;

identifying the child directory as the directory that serves as a start point in a search for a file relevant to the application in a case of which none of the brother directories have been created within the given period of time from the creation time of the child directory; and identifying the child directory and the brother directories that have been created within the given period of time from the creation time of the child directory as the directories that serve as start points in a search for a file relevant to the application in a case of which some of the brother directories have been created within the given period of time from the creation time of the child directory; and searching, with the identified directory as the start point, for a file accessed after the execution start time of the application.

2. The file search method according to claim 1, wherein the given period of time is determined based on a type of an operating system for executing the application.

3. The file search method according to claim 1, wherein the step of identifying a directory that serves as a start point in a search for a file relevant to the application includes the step of identifying the child directory as the directory that serves as a start point in a search for a file relevant to the application in a case of which the parent directory is a directory that serves as a start point in a search for a file relevant to another application.

4. The file search method according to claim 1, further comprising the steps of:

obtaining access date/times of directories below the directory that serves as a start point and of files stored in the directories which is lower than the directory that serves as a start point before executing the step of searching for a file relevant to the application;

executing the step of searching for a file relevant to the application based on the obtained access date/times; and changing current access date/times of the directories below the directory that serves as a start point and of the files stored in the directories which is lower than the directory that serves as a start point to the obtained access date/times after the step of searching for a file relevant to the application is finished.

5. The file search method according to claim 1, wherein the memory stores application configuration information which contains the process information of each computer that executes the application, and wherein the file search method further comprises the steps of:

periodically obtaining the execution start time and file path of the application from the each computer that executes the application;

comparing the process information obtained from the each computer that executes the application with the process information contained in the application configuration information to detect a newly activated application; and searching for a file relevant to the detected application.

6. The file search method according to claim 1, wherein the step of searching for a file relevant to the application is not executed in a case of which an activation time of the application has not been updated since a file search has been executed for the application last time.

7. The file search method according to claim 1, further comprising the steps of:

assigning each of retrieved files a value that indicates how likely the retrieved file is to be relevant to the application; and outputting the retrieved file according to the value that indicates how likely the retrieved file is to be relevant to the application.

8. The file search method according to claim 7, further comprising the step of receiving an input for confirming whether the retrieved file is relevant or irrelevant to the application, wherein the step of outputting the retrieved file includes the step of outputting files confirmed to be relevant to the application and files that have not been confirmed to be relevant or irrelevant to the application yet.

9. The file search method according to claim 7, wherein the value that indicates how likely the retrieved file is to be relevant to the application is determined based on a name of one of the retrieved file and of a directory that stores the retrieved file.

10. The file search method according to claim 7, wherein the value that indicates how likely the retrieved file is to be relevant to the application is determined based on an extension of the retrieved file.

11. The file search method according to claim 10, wherein the memory stores extension information which includes the extension of a file and the value that indicates how likely the file is to be relevant to the application, and wherein the step of outputting the retrieved file includes the step of outputting files that have been retrieved and whose extensions are found in the extension information and files that have been retrieved and whose extensions are not found in the extension information in a distinguishing manner.

12. The file search method according to claim 11, further comprising the step of receiving, when the extension of the retrieved file is absent in the extension information, an input of information associated with the extension of the retrieved file, and adding the input information to the extension information.

13. The file search method according to claim 1,
wherein the file search apparatus is notified, when another application is newly activated, of the newly activated application by a computer that executes the application, and
wherein the file search method further comprises the step of searching for a file relevant to the newly activated application.

14. The file search method according to claim 1,
wherein the application is executed in a plurality of computers separately,
wherein the file search method further comprises the steps of:
searching for a file relevant to the application separately for each of the plurality of computers that execute the application; and
displaying a file that is included in search results of two or more of the plurality of computers that execute the application in a manner that distinguishes this file from a file that is included in a search result of only one of the plurality of computers that execute the application.

15. The file search method according to claim 1,
wherein the application is executed in computers including a first computer for which whether the retrieved file is relevant or irrelevant to the application has been confirmed and a second computer for which whether the retrieved file is relevant or irrelevant to the application has not been confirmed yet, and
wherein whether a file retrieved in the second computer is relevant or irrelevant to the application is judged based on a confirmation made in the first computer.

16. A file search apparatus which searches for a file relevant to an application, comprising:
an interface;
a processor coupled to the interface; and
a memory coupled to the processor,
wherein the processor is configured to:
obtain an execution start time and file path of the application;
identify, from the obtained file path, a directory that serves as a start point in a search for a file relevant to the application; and
search, with the identified directory as the start point, for a file accessed after the execution start time of the application.

17. A search system comprising:
a computer which executes an application; and
a file search apparatus which searches for a file relevant to the application,
wherein the computer has a first interface coupled to the file search apparatus, a first processor coupled to the first interface, and a first memory coupled to the first processor,
wherein the first memory stores process information associated with a process, created by executing the application,
wherein the file search apparatus has a second interface coupled to the computer, a second processor coupled to the second interface, and a second memory coupled to the second processor,
wherein the computer notifies the file search apparatus of the activated application when an application is activated, and
wherein the file search apparatus is configured to:
obtain from the computer an execution start time and file path of the notified application which are contained in the process information;
identify, from the obtained file path, a directory that serves as a start point in a search for a file relevant to the notified application,
wherein the step of identifying a directory that serves as a start point in a search for a file relevant to the application includes the step of:
setting a directory above a directory that stores the application as a parent directory based on the obtained file path;
setting a directory that is created in the parent directory and that is contained in the obtained file path as a child directory;
setting other directories created in the parent directory than the child directory as brother directories;
comparing a creation time of the child directory with creation times of the brother directories;
identifying the parent directory as the directory that serves as a start point in a search for a file relevant to the application in a case of which all of the brother directories have been created within a given period of time from the creation time of the child directory;
identifying the child directory as the directory that serves as a start point in a search for a file relevant to the application in a case of which none of the brother directories have been created within the given period of time from the creation time of the child directory; and
identifying the child directory and the brother directories that have been created within the given period of time from the creation time of the child directory as the directories that serve as start points in a search for a file relevant to the application in a case of which some of the brother directories have been created within the given period of time from the creation time of the child directory; and
search, with the identified directory as the start point, for a file accessed after the execution start time of the notified application.

18. A computer-readable medium recorded with a file search program which is executed in a file search apparatus for searching for a file relevant to an application, the file search program controlling the file search apparatus to execute the steps of:
obtaining process information which contains an execution start time and file path of the application;
identifying, from the obtained file path, a directory that serves as a start point in a search for a file relevant to the application,
wherein the step of identifying a directory that serves as a start point in a search for a file relevant to the application includes the step of:
setting a directory above a directory that stores the application as a parent directory based on the obtained file path;
setting a directory that is created in the parent directory and that is contained in the obtained file path as a child directory;
setting other directories created in the parent directory than the child directory as brother directories;
comparing a creation time of the child directory with creation times of the brother directories;
identifying the parent directory as the directory that serves as a start point in a search for a file relevant to the application in a case of which all of the brother directories have been created within a given period of time from the creation time of the child directory;

identifying the child directory as the directory that serves as a start point in a search for a file relevant to the application in a case of which none of the brother directories have been created within the given period of time from the creation time of the child directory; and identifying the child directory and the brother directories that have been created within the given period of time from the creation time of the child directory as the directories that serve as start points in a search for a file relevant to the application in a case of which some of the brother directories have been created within the given period of time from the creation time of the child directory; and searching, with the identified directory as the start point, for a file accessed after the execution start time of the application.

* * * * *